US012578238B1

(12) United States Patent
Kamath Koteshwara et al.

(10) Patent No.: US 12,578,238 B1
(45) Date of Patent: Mar. 17, 2026

(54) AMBIENT TEMPERATURE AND RELATIVE HUMIDITY SENSING USING ULTRASOUND SIGNALS

(71) Applicant: Amazon Technologies, Inc., Seattle, WA (US)

(72) Inventors: Krishna Kamath Koteshwara, San Jose, CA (US); Berkant Tacer, Bellevue, WA (US); Karthik Kumar, Seattle, WA (US); Carlos Renato Nakagawa, San Jose, CA (US); Sai Ravi Teja Pulugurtha, Milpitas, CA (US); Ke Sun, San Diego, CA (US)

(73) Assignee: Amazon Technologies, Inc., Seattle, WA (US)

( * ) Notice: Subject to any disclaimer, the term of this patent is extended or adjusted under 35 U.S.C. 154(b) by 564 days.

(21) Appl. No.: 18/070,961

(22) Filed: Nov. 29, 2022

(51) Int. Cl.
G01K 11/22 (2006.01)
G01K 11/24 (2006.01)
G01K 11/26 (2006.01)

(52) U.S. Cl.
CPC .............. G01K 11/22 (2013.01); G01K 11/24 (2013.01); G01K 11/26 (2013.01)

(58) Field of Classification Search
CPC ......... G01K 11/22; G01K 11/24; G01K 11/26
See application file for complete search history.

(56) References Cited

U.S. PATENT DOCUMENTS

| | | | | |
|---|---|---|---|---|
| 3,595,082 A * | 7/1971 | Miller, Jr. .............. | G01K 11/26 |
| | | | 360/7 |
| 5,360,268 A * | 11/1994 | Hayashi ................. | G01K 11/22 |
| | | | 374/119 |
| 5,624,188 A * | 4/1997 | West ...................... | G01K 11/24 |
| | | | 374/119 |
| 9,273,548 B2 * | 3/2016 | LeBlanc ................. | E21B 47/06 |
| 10,445,934 B1 * | 10/2019 | Worley, III .......... | H04N 13/363 |
| 2011/0314897 A1 * | 12/2011 | Schellekens ......... | G01N 29/348 |
| | | | 73/23.3 |
| 2015/0117157 A1 * | 4/2015 | Li ........................... | G01K 1/00 |
| | | | 367/189 |
| 2016/0299014 A1 * | 10/2016 | Li ......................... | G01N 29/024 |
| 2017/0003176 A1 * | 1/2017 | Phan Le .............. | G01N 29/024 |

(Continued)

*Primary Examiner* — Laura Martin
*Assistant Examiner* — Philip L Cotey
(74) *Attorney, Agent, or Firm* — Eversheds Sutherland (US) LLP

(57) ABSTRACT

Technologies directed to ambient temperature and relative humidity sensing using ultrasound signals are described. One device can emit an ultrasound signal using a speaker and measure the ultrasound signal using a microphone. The device can determine, using the ultrasound signal, a signal component corresponding to a direct propagation path (DPP) between the speaker and the microphone. The device determines, using the signal component, a first sound propagation property representing a speed of the ultrasound signal along the DPP. The device determines, using the signal component across different frequency bands, second sound propagation properties, each representing a sound attenuation of the ultrasound signal along the DPP in the respective frequency band. The device determines an ambient temperature value and a relative humidity value using a regression model based on the first sound propagation property and the second sound propagation properties.

17 Claims, 19 Drawing Sheets

(56) References Cited

U.S. PATENT DOCUMENTS

| | | | | |
|---|---|---|---|---|
| 2019/0226921 A1* | 7/2019 | Zivkovic | ............... | G01K 11/24 |
| 2020/0072680 A1* | 3/2020 | Phan Le | ............... | G01K 11/24 |
| 2021/0078722 A1* | 3/2021 | Shannon | ............... | G01K 11/24 |
| 2021/0345939 A1* | 11/2021 | Jumbe | ................... | H04R 1/028 |
| 2022/0291066 A1* | 9/2022 | Krywyj | ............... | G01M 3/243 |
| 2023/0346265 A1* | 11/2023 | Shin | .................... | A61B 5/4815 |
| 2025/0112711 A1* | 4/2025 | Nilsson | ................. | H04B 17/12 |

* cited by examiner (a) speed of sound (b) Attenuation ($F_c = 32$ kHz)

(c) Attenuation v.s. Humidity across frequencies ($T = 20°C$)

(d) Attenuation v.s. Temperature across frequencies ($RH = 40\%$)

IMPULSE RESPONSE (PASSBAND)

402

PLAYBACK SIGNALS 404

MICROPHONE SIGNALS 406

CROSS-CORRELATION 408

IMPULSE RESPONSE 410

IMPULSE RESPONSE (BASEBAND)

412

PLAYBACK SIGNALS 404

DEMODULATED TO BASEBAND 418

MICROPHONE SIGNALS 406

DEMODULATED TO BASEBAND 420

BASEBAND CROSS-CORRELATION 414

IMPULSE RESPONSE 410

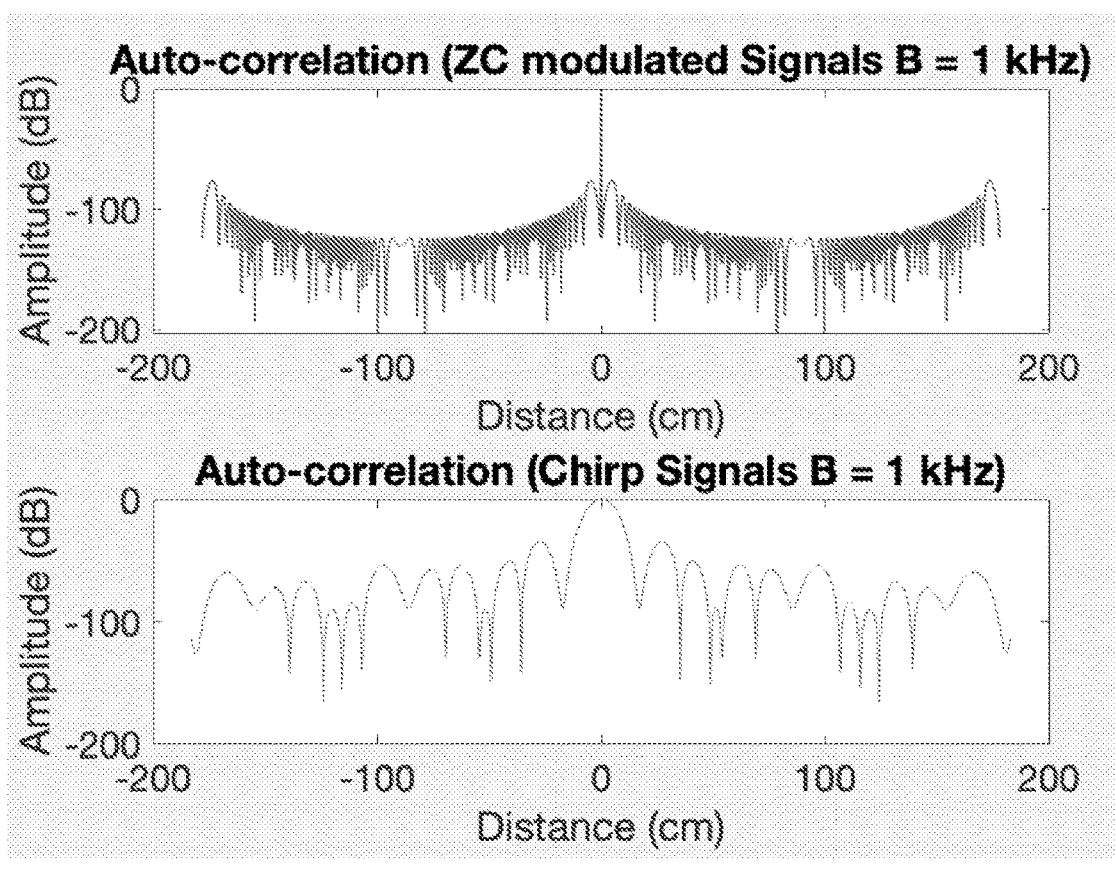
FIG. 5

702
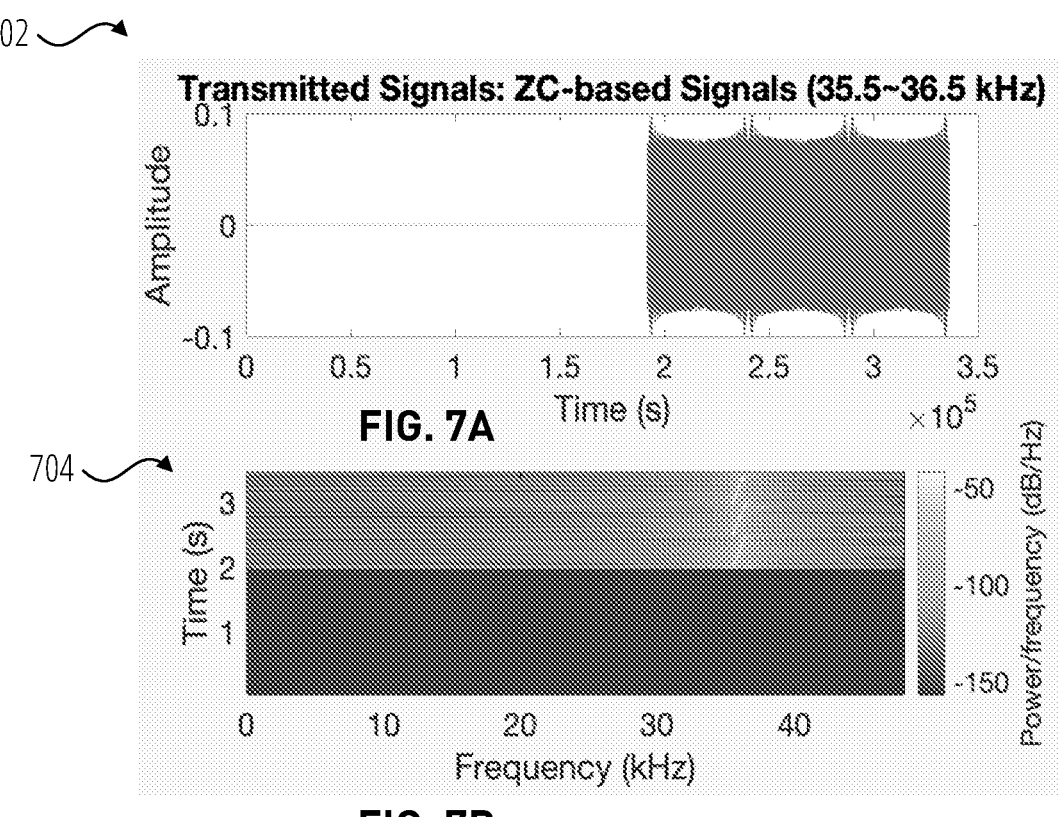
FIG. 7A
704
FIG. 7B
706
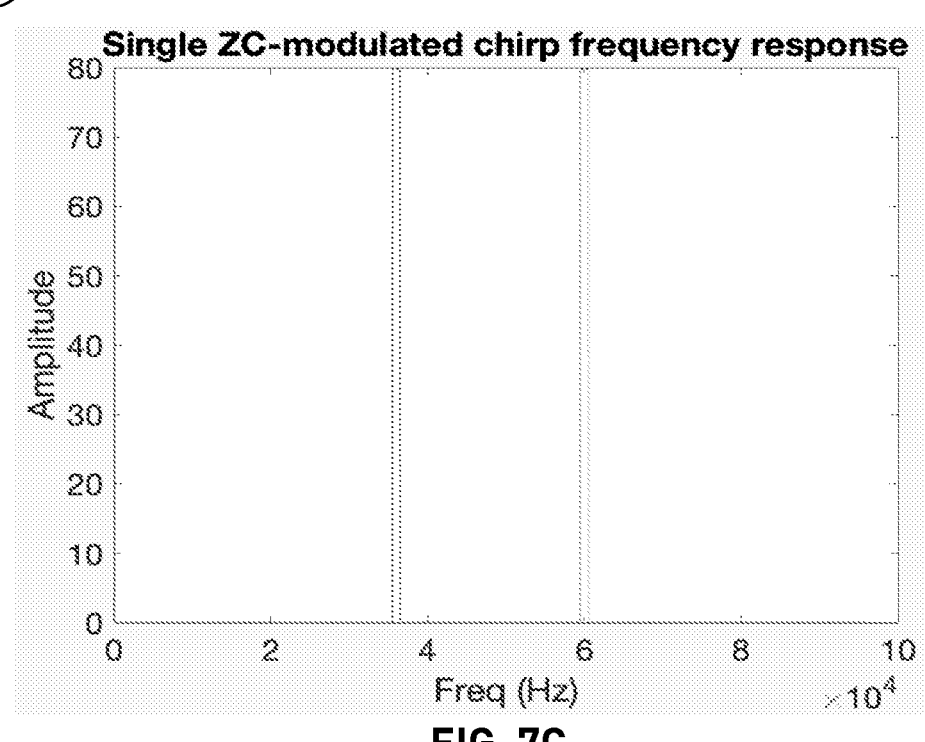
FIG. 7C

902

904

906

(a) IR across different tempera- (b) IR across different humidities
tures ($RH = 50\%$)                ($T = 21°C$)

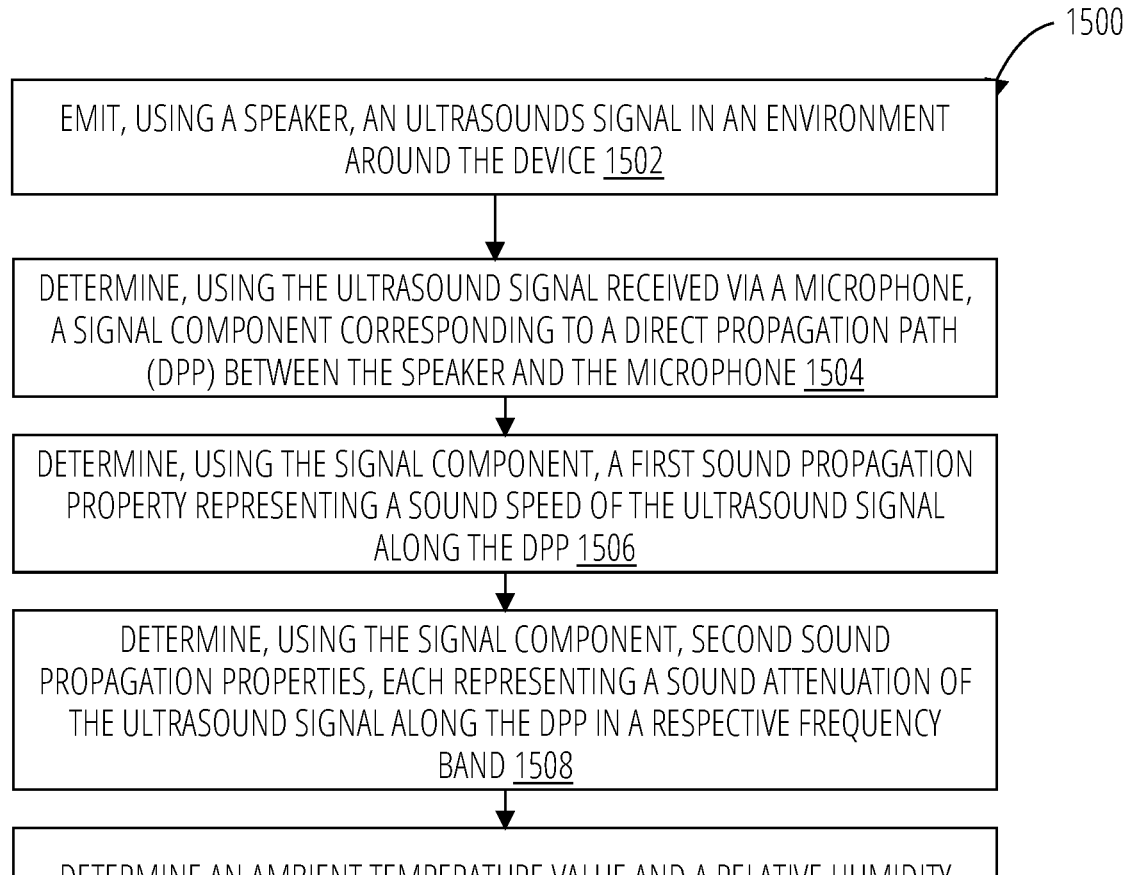

1500

EMIT, USING A SPEAKER, AN ULTRASOUNDS SIGNAL IN AN ENVIRONMENT AROUND THE DEVICE 1502

DETERMINE, USING THE ULTRASOUND SIGNAL RECEIVED VIA A MICROPHONE, A SIGNAL COMPONENT CORRESPONDING TO A DIRECT PROPAGATION PATH (DPP) BETWEEN THE SPEAKER AND THE MICROPHONE 1504

DETERMINE, USING THE SIGNAL COMPONENT, A FIRST SOUND PROPAGATION PROPERTY REPRESENTING A SOUND SPEED OF THE ULTRASOUND SIGNAL ALONG THE DPP 1506

DETERMINE, USING THE SIGNAL COMPONENT, SECOND SOUND PROPAGATION PROPERTIES, EACH REPRESENTING A SOUND ATTENUATION OF THE ULTRASOUND SIGNAL ALONG THE DPP IN A RESPECTIVE FREQUENCY BAND 1508

DETERMINE AN AMBIENT TEMPERATURE VALUE AND A RELATIVE HUMIDITY VALUE BASED ON THE FIRST SOUND PROPAGATION PROPERTY AND THE SECOND SOUND PROPAGATION PROPERTIES 1510

FIG. 15

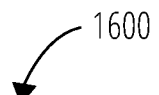

1600

| EMIT AN ULTRASOUNDS SIGNAL USING A SPEAKER 1602 |
|---|

$\downarrow$

| DETERMINE, USING THE MEASURED ULTRASOUND SIGNAL RECEIVED VIA A MICROPHONE, A SIGNAL COMPONENT CORRESPONDING TO A DIRECT PROPAGATION PATH (DPP) BETWEEN THE SPEAKER AND THE MICROPHONE 1604 |
|---|

$\downarrow$

| DETERMINE, USING THE SIGNAL COMPONENT, A FIRST SOUND PROPAGATION PROPERTY REPRESENTING A SPEED OF THE ULTRASOUND SIGNAL ALONG THE DPP 1606 |
|---|

$\downarrow$

| DETERMINE, USING THE SIGNAL COMPONENT, SECOND SOUND PROPAGATION PROPERTIES, EACH REPRESENTING A SOUND ATTENUATION OF THE ULTRASOUND SIGNAL ALONG THE DPP IN A RESPECTIVE FREQUENCY BAND 1608 |
|---|

$\downarrow$

| ESTIMATE AN AMBIENT TEMPERATURE VALUE USING A FIRST REGRESSION MODEL BASED ONLY ON THE FIRST SOUND PROPAGATION PROPERTY 1610 |
|---|

$\downarrow$

| ESTIMATE A RELATIVE HUMIDITY VALUE USING A SECOND REGRESSION MODEL CORRESPONDING TO THE AMBIENT TEMPERATURE VALUE BASED ON THE FIRST SOUND PROPAGATION PROPERTY AND THE SECOND SOUND PROPAGATION PROPERTIES 1612 |
|---|

FIG. 16

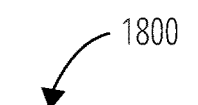
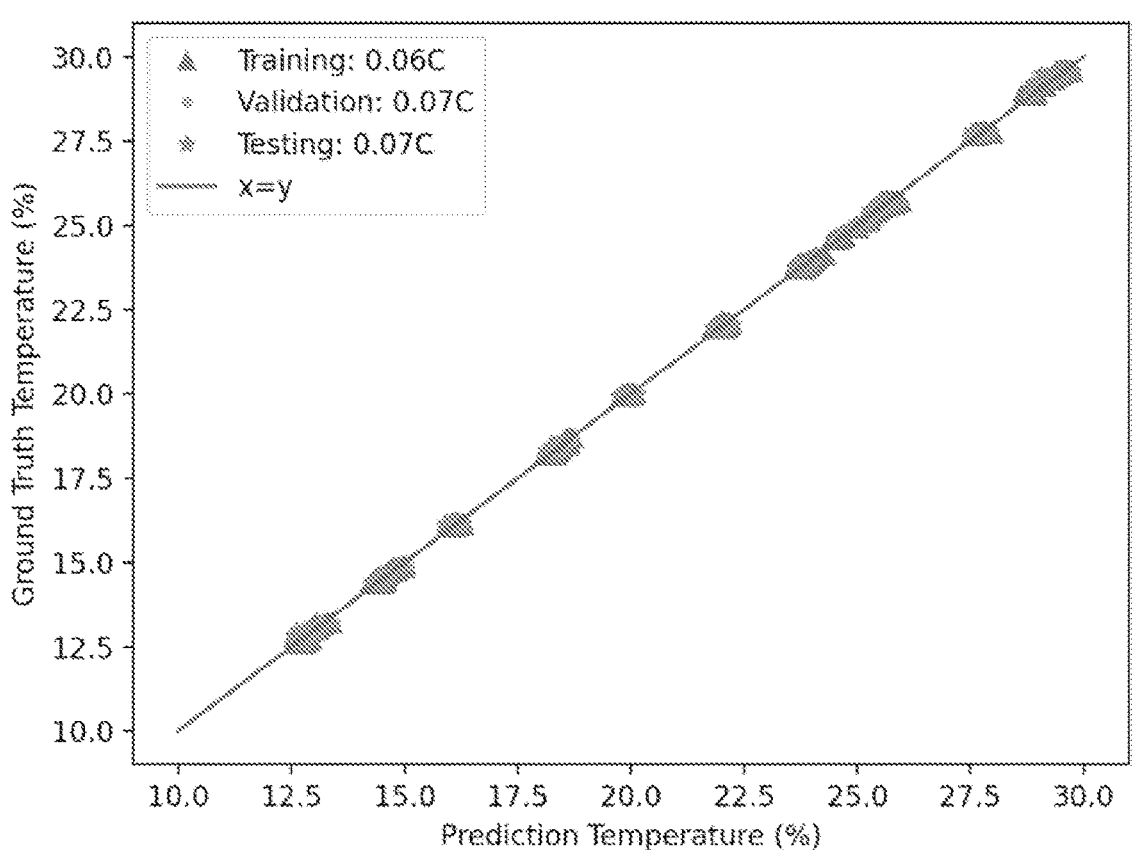
FIG. 18A

1802

AMBIENT TEMPERATURE AND RELATIVE HUMIDITY SENSING USING ULTRASOUND SIGNALS

BACKGROUND

A large and growing population of users is enjoying entertainment through digital media, such as music, movies, images, electronic books, etc. The users employ various electronic devices to consume such media items. Among these electronic devices (referred to as endpoint devices, user devices, clients, client devices, or user equipment) are electronic book readers, cellular telephones, personal digital assistants (PDAs), portable media players, tablet computers, netbooks, laptops, and the like. These electronic devices wirelessly communicate with a communications infrastructure to enable the consumption of digital media items. In order to wirelessly communicate with other devices, these electronic devices include one or more antennas.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

FIG. 5 is a graph illustrating an autocorrelation of a Zadoff-Chu (ZC) sequence and an autocorrelation of a frequency-modulated continuous wave (FMCW) signal, according to at least one embodiment.

FIG. 7A is a graph illustrating amplitudes of transmitted signals based on the ZC-sequence modulated signals according to at least one embodiment.

FIG. 7B is a graph illustrating three ZC chirps according to at least one embodiment.

FIG. 7C is a graph illustrating a frequency response of a single ZC-modulated chirp according to at least one embodiment.

FIG. 15 is a flow diagram of a method of determining an ambient temperature value and a relative humidity value using ultrasound signals according to at least one embodiment.

FIG. 16 illustrates a method in accordance with one embodiment.

FIG. 18A is a graph illustrating the results of a temperature regression model according to one embodiment.

DETAILED DESCRIPTION

Figure 1:
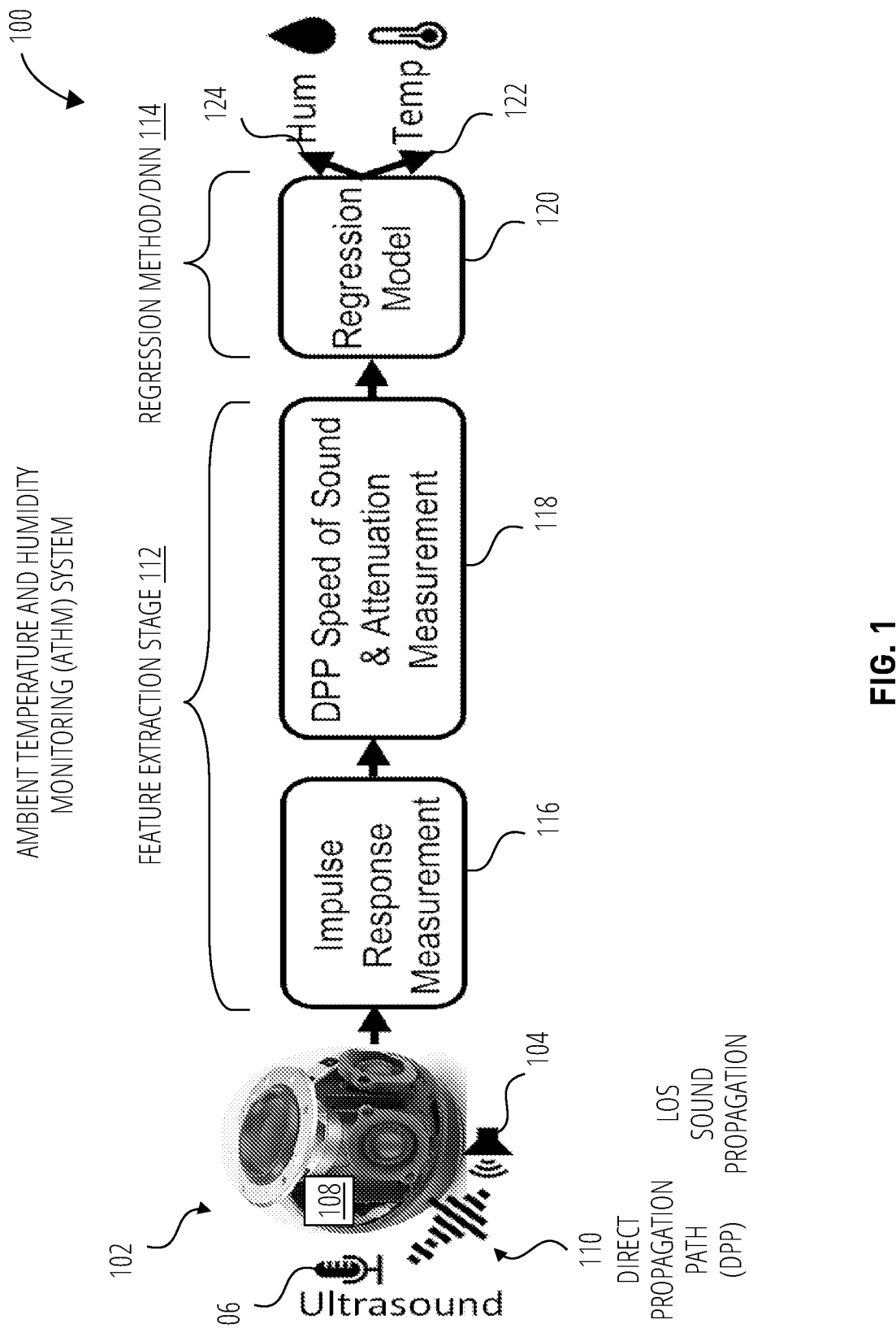
FIG. 1 is a block diagram of an Ambient Temperature and Humidity Monitoring (ATHM) system for estimating an ambient temperature value and a relative humidity value according to at least one embodiment.

Technologies directed to ambient temperature and relative humidity sensing using ultrasound signals are described. Thermal comfort is significant for a better smart home experience. In the indoor environment, thermal comfort is determined by the room's temperature, humidity, and air speed. Smart speaker devices, like the Echo devices developed by Amazon Technologies, have become user interfaces to the smart home ecosystem, offering hands-free interaction and acting as a sensor hub that provides an all-in-one solution for the smart home ecosystem. Enabling precise Ambient Temperature and Humidity Monitoring (ATHM) on a smart speaker device can unlock key features in the smart home, like automatic control of Heating, Ventilation, and Air Conditioning (HVAC) systems and learning of the users' T&RH preferences. Enabling precise ATHM is a vital part of building a smart home ecosystem. Traditional thermometers and humidity meters can measure ambient temperature and relative humidity (T&RH). Existing T&RH sensors cannot be easily deployed on smart speaker devices. First, these T&RH sensors can only measure the T&RH at a specific location, usually inside the device. The heat from neighboring electronic components can significantly affect the T&RH inside the smart speaker devices. Second, the most common T&RH sensors are based on thermistors and humistors. Thus, when the T&RH change, their response is delayed due to the time it takes for sensor material to get cool/warm and dry/wet. Lastly, deploying these sensors in smart speaker devices adds cost: the cost of the sensor, hardware integration, and the calibration procedure. Thus, integrating standalone T&RH sensors on a device is expensive and requires complex algorithms to correct for thermal interference.

Aspects and embodiments of the present disclosure address the above and other deficiencies by providing precise ATHM in a device with an algorithm (referred to as UltraTRH) that uses an ultrasonic sensing capability of a device with no additional hardware. The algorithm can measure the speed of sound and frequency-dependent ultrasonic attenuation to estimate the ambient temperature and relative humidity (T&RH) with comparable accuracy and faster response than traditional T&RH sensors. Aspects and embodiments of the present disclosure can provide a virtual thermometer and a virtual humidity meter. Ultrasound attenuation and sound speed will change when the ambient temperature and relative humidity change. Aspects and embodiments of the present disclosure can measure Line-of-Sight (LoS) propagation sound speed change and LoS propagation sound attenuation change across different frequencies using speakers and microphones of a device using an ATHM system to estimate an ambient temperature value and a relative humidity value. To achieve the real-time estimation of temperature and humidity, the device modulates multiple Zadoff-Chu sequence Orthogonal Frequency-Division Multiplexing (OFDM) signals across different frequency bands using a single chip at the ultrasound frequency and demodulates to extract the impulse response and phase information across different frequency bands. The impulse responses are fed into regression models to estimate temperature and humidity.

Aspects and embodiments of the present disclosure can utilize ultrasonic sensing, such as deployed on existing smart speaker devices, such as the Amazon Echo device, to achieve ATHM with zero additional hardware cost. Aspects and embodiments of the present disclosure do not affect the voice assistant's normal functionality because the ATHM system operates in the inaudible ultrasonic frequency range. The ATHM system is based on the fact that ultrasound propagation properties, i.e., sound attenuation and the speed of sound, are physically affected by ambient T&RH. Therefore, the ATHM system measures the averaged T&RH of the air along the direct sound propagation path, as illustrated in FIG. 1.

Aspects and embodiments of the present disclosure of the virtual thermometer and humidity meter can provide advantages such as the following: i) it will have zero hardware cost for the devices with ultrasound, especially for low-cost devices; ii) the speakers and microphones on the device have already been exposed to the ambient environment, which makes it merely be affected by the thermal change of the device itself; and iii) it will have faster response time than the traditional thermometer and humidity meter.

FIG. 1 is a block diagram of an ATHM system 100 for estimating an ambient temperature value 122 and a relative humidity value 124 according to at least one embodiment. The ATHM system 100 includes a device 102 with one or more speakers 104, one or more microphones 106, and a processing device 108. The device 102 can be a voice-controlled device, a home automation device, a television, a set-top-box, a desktop computer, a security camera, a doorbell device, an electronic book reader, a personal digital assistant, a gaming controller, a gaming console, a mobile phone, a laptop computer, a portable media player, a tablet computer, a camera, a video camera, a netbook, an electronic notebook, a media player device, a media center, a sleep tracker device, a hands-free speaker, a hands-free virtual assistant device, or the like.

During the operation to achieve ATHM, the ATHM system 100 emits an ultrasound signal (e.g., 32-42 kHz) using speaker 104 (e.g., a tweeter) on the device 102 (e.g., a smart speaker device). The ultrasound signal travels through the air and is recorded by the one or more microphones 106. The ATHM system 100 measures the ultrasound signal using the one or more microphones 106 and determines, using the ultrasound signal, a signal component corresponding to a direct propagation path (DPP) 110 between the speaker 104 and the microphone 106 (e.g., where the sound travels from the speaker 104 directly to the microphone 106. That is, the ATHM system 100 separates signal components corresponding to the DPP 110 (referred to as DPP signal) from signal components corresponding to later arriving reflected paths (referred to as reflected signals). In at least one embodiment, the ATHM system 100 includes a feature extraction stage 112 and a regression method stage 114 (e.g., or a deep neural network stage). The feature extraction stage 112 can take an impulse response (IR) measurement 116 and a DPP speed of Sound and attenuation measurement 118. In at least one embodiment, the ATHM system 100 determines, using the signal component, a first sound propagation property representing a sound speed of the ultrasound signal along the DPP 110. The ATHM system 100 determines, using the signal component across different frequency bands, second sound propagation properties, each representing a sound attenuation of the ultrasound signal along the DPP 110 in the respective frequency band. The regression method stage 114 can use features extracted in the feature extraction stage 112 to estimate an ambient temperature value 122 and a relative humidity value 124. In at least one embodiment, feature extraction stage 112 can be implemented with a signal processing pipeline that extracts the stable DPP first sound propagation properties from other propagation paths for ATHM with a fast response time (e.g., less than 1.5 seconds). In at least one embodiment, the ATHM system 100 determines the ambient temperature value 122 and the relative humidity value 124 using a regression model 120 based on the first sound propagation property and the second sound propagation properties. The ATHM system 100 can measure sound speed and attenuation together along the DPP 110 by employing the regression model 120, which maps the measured features to the ambient T&RH.

As described in more detail below, the regression model 120 is trained to model the frequency dependence of ultrasound propagation properties for determining ambient temperature value 122 and relative humidity value 124. In at least one embodiment, the regression method stage 114 can use a two-step T&RH co-estimation method using regression model 120. In at least one embodiment, a first trained temperature regression sub-model can estimate the ambient temperature value 122 in a first step of the two-step T&RH co-estimation method. In a second step of the two-step T&RH co-estimation model, the regression method stage 114 can select one of multiple trained humidity regression sub-models, corresponding to the estimated ambient temperature, to estimate a relative humidity value 124. In at least one embodiment, the regression model 120 can predict relative humidity value 124 with a ±2% accuracy margin and the ambient temperature value 122 with ±0.2° C. accuracy margin with 95% confidence.

In general, the basic idea of the ATHM system 100 is that both the ultrasound attenuation and propagation speed will change across different temperatures and humidity. The ATHM system 100 can use different transmitted ultrasound signals and feature extraction techniques in feature extraction stage 112. In at least one embodiment, to capture suitable features for temperature and humidity sensing, the ATHM system 100 uses a Zadoff-Chu (ZC) sequence, OFDM modulated ultrasound signals across different frequency bands. By using these transmitted signals, the ATHM system 100 can simultaneously measure the IR response and phase information across different frequency bands (e.g., within 1.5 seconds). Different feature engineering and regression models can be developed for feature extraction stage 112 and regression method stage 114. When operating in normal and chamber environments with a temperature range of 10 C~30 C and 20%~70% relative humidity (RH), the ATHM system 100 can achieve about 2% RH, and 0.2 C mean average error (MAE), respectively, within 1.5 seconds in these environments. The ATHM system 100 can be used across various locations and within different types of devices.

In another embodiment, the ATHM system 100 can measure i) the Line-of-Sight (LoS) propagation sound speed change and ii) the LoS propagation sound attenuation change across different frequencies. Different ultrasound signals can be used based on range resolution, autocorrelation, and bandwidth requirements. As described herein, the ZC sequence can be modulated to multiple sub-bands in the ultrasound frequency in a single chirp (e.g., 500 milliseconds). The ATHM system 100 can demodulate the ultrasound signals to extract the IR across the different sub-bands. The ATHM system 100 can extract a set of features in the feature extraction stage 112, where the set of features corresponds to a first sound propagation property representing sound speed and second sound propagation properties representing sound attenuations across different frequency bands (also referred to as sub-bands). These sound propagation properties can be input as a feature set into the regression model 120 to estimate temperature and humidity simultaneously.

Described below is the physical relationship between T&RH and sound propagation properties with respect to FIG. 2A to FIG. 2D.

Figures 2A, 2B, 2C, 2D:
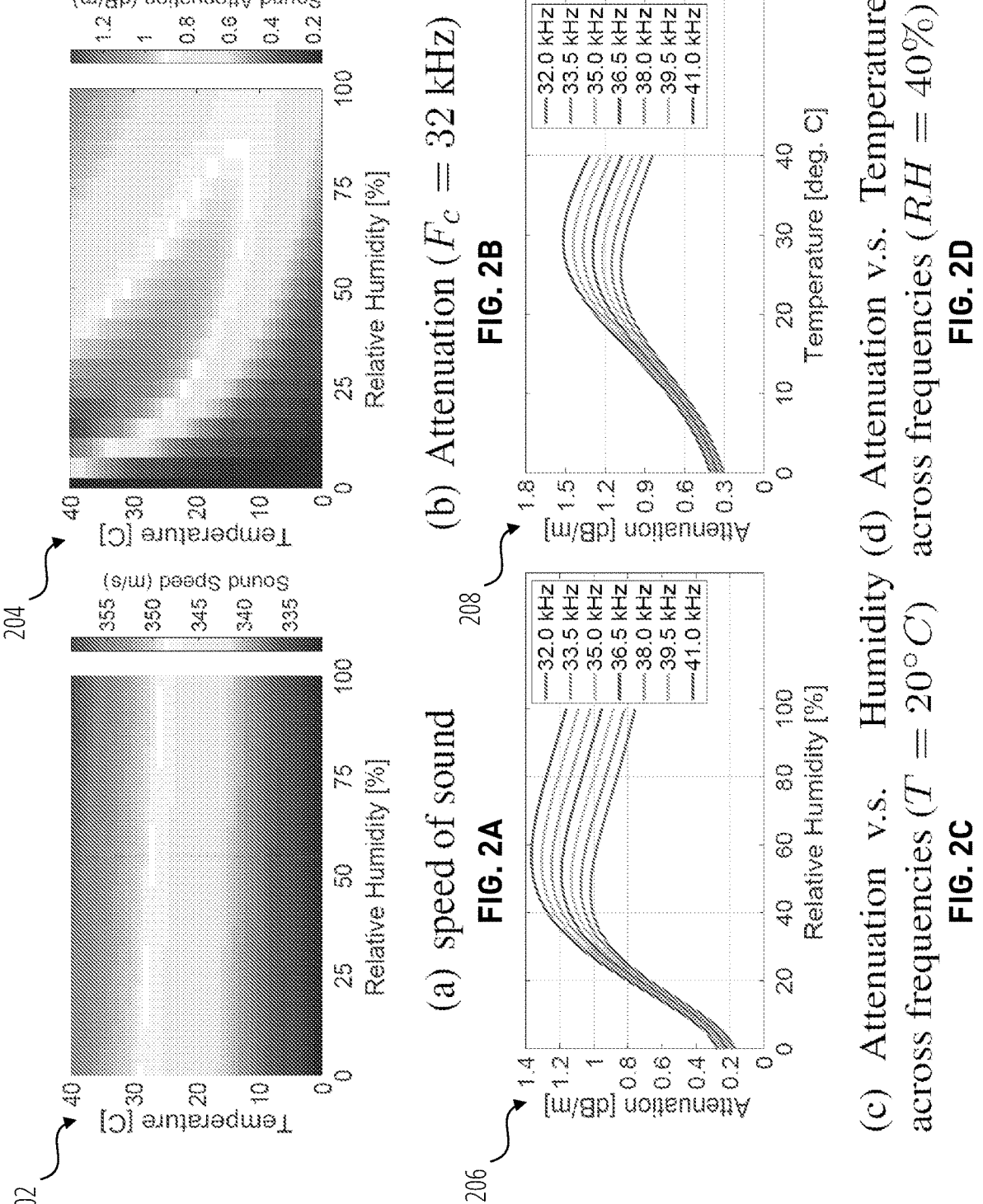
FIG. 2A is a graph showing the speed of sound across a temperature range of 0 to 40 degrees Celsius and a relative humidity range of 0 to 100 percent at 1 atmosphere (atm) pressure according to at least one embodiment.
FIG. 2B is a graph showing the sound attenuation across a temperature range of 0 to 40 degrees Celsius and a relative humidity range of 0 to 100 percent at 1 atm pressure at different ultrasonic frequencies according to at least one embodiment.
FIG. 2C is a graph showing the sound attenuation versus relative humidity across different frequencies with a fixed temperature of 20 degrees Celsius according to at least one embodiment.
FIG. 2D is a graph showing the sound attenuation versus ambient temperature across different frequencies with a fixed relative humidity of 40 percent according to at least one embodiment.

FIG. 2A is a graph 202 showing the speed of sound across a temperature range of 0 to 40 degrees Celsius (40 C) and a relative humidity range of 0 to 100 percent at 1 atm pressure according to at least one embodiment. The speed of sound in the air depends on environmental factors, including (i) temperature, (ii) humidity, and (iii) air pressure. As illustrated in FIG. 2A, the speed of sound is more sensitive to temperature as compared to humidity. As a result, in prior work, only the temperature was measured using the speed of sound without considering humidity, with the reasoning that RH changes will introduce only a maximum error of 2.5° C. at high temperatures (e.g., near T=40 C). In ATHM system 100, both T&RH are estimated together to minimize this error. As illustrated in FIG. 2A, the speed of sound can be estimated using either the direct path Time-of-Flight (ToF) or Time-Difference-of-Arrival (TDoA). The ToF and TDoA differences caused by the temperature change are larger when the DPP 110 is longer. However, in a smart speaker device, the loudspeaker and microphones are located fairly close to each, typically less than or equal to 20 cm, making it challenging to achieve precise ATHM. The ATHM system 100 can improve accuracy by co-estimating the frequency-dependent ultrasonic attenuation illustrated in FIG. 2B.

FIG. 2B is a graph 204 showing the sound attenuation across a temperature range of 0 to 40 C and a relative humidity range of 0 to 100 percent at 1 atm pressure at different ultrasonic frequencies according to at least one embodiment. The sound attenuation in air depends not only on the environmental factors, i.e., (i) temperature, (ii) humidity, and (iii) air pressure, but also on (iv) sound frequency. As illustrated in FIG. 2B, the sound attenuation (dB/m) across 0-40 C temperature and 0-100% RH at 1 atm air pressure increases as the frequency increases from 32 kHz to 41 kHz. As illustrated in FIG. 2C and FIG. 2D where the temperature or relative humidity is fixed, respectively, the sound attenuation across different frequencies can be uniquely mapped to specific T&RH values.

FIG. 2C is a graph 206 showing the sound attenuation versus relative humidity across different frequencies with a fixed temperature of 20 C according to at least one embodiment. FIG. 2D is a graph 208 showing the sound attenuation versus ambient temperature across different frequencies with a fixed relative humidity of 40 percent according to at least one embodiment. As shown in FIG. 2C and FIG. 2D, even when one factor, i.e., the temperature or humidity, is fixed, the sound attenuation does not monotonically increase with the RH. Therefore, measuring the sound attenuation at any one ultrasonic frequency can be insufficient and lead to ambiguity in humidity and temperature estimation. The microphone signal is a superposition of multiple propagation paths. To achieve ATHM, the ATHM system 100 needs to separate the DPP signal from the other propagation path signals, which can be affected by sound absorption at the various reflecting surfaces along the path. Similar to sound speed estimation, a larger DPP distance will lead to larger changes caused by the T&RH change. However, in the embodiments of a smart speaker device for ATHM, the DPP distances are limited to less than 20 cm, and the usable ultrasonic frequencies are limited to less than 48 kHz, potentially making this more challenging than devices with DPP distance of 2 meters and 400 KHz frequency.

There are four factors for ultrasound attenuation, including ambient air temperature, ambient air humidity, sound frequency, and sound propagation distance. The first two factors are something that the ATHM system 100 can extract from the ultrasound attenuation. The third factor, "sound frequency," can be controlled by the ATHM system 100 transmitting different ultrasound signals. The fourth factor, "sound propagation distance," is a factor that needs to be mitigated to realize location-independent temperature and humidity measuring. FIG. 2C and FIG. 2D demonstrate the sound attenuation (dB/m) across different sound frequencies when fixing the air temperature or humidity. The ATHM system 100 can achieve super-resolution ultrasound attenuation measurements to realize temperature and humidity sensing.

In at least one embodiment, for a specific frequency of 32 kHz and a fixed temperature of T=20 C, the sound attenuation has the following values for different humidity percentages, as illustrated in Table 1.

TABLE 1

| | Humidity (RH) | | | | | | | |
|---|---|---|---|---|---|---|---|---|
| | 10% | 20% | 30% | 40% | 50% | 60% | 70% | 80% |
| Attenuation (dB/m) | 0.36 | 0.67 | 0.90 | 1.01 | 1.02 | 0.98 | 0.92 | 0.86 |

When the RH range is from 40%~ 60%, the sound attenuation only changes by 0.03 dB/m.

In at least one embodiment, for a specific frequency of 32 kHz and a fixed humidity of RH=40%, the sound attenuation has the following values for different temperatures, as illustrated in Table 2.

TABLE 2

| | Temperature (T) | | | | | |
|---|---|---|---|---|---|---|
| | 10°C | 15° C. | 20° C. | 25° C. | 30° C. | 35° C. |
| Attenuation (dB/m) | 0.61 | 0.83 | 1.01 | 1.08 | 1.05 | 0.95 |

When the temperature range is from 20° C. to 30° C., the sound attenuation only changes by 0.07 dB/m. As described herein, the ATHM system 100 measures the sound attenuation across different frequencies to map the sound attenuation to a specific temperature and humidity. As shown in the above figures, the sound attenuation change does not keep increasing while the temperature or humidity increases. Therefore, using the sound attenuation of a single-frequency ultrasound can be insufficient to map to a specific temperature and humidity. As described herein, the ATHM system 100 can measure the LoS ultrasound attenuation to mitigate the interference from dynamic sound propagation distance caused by the multipath effect. The overall ultrasound attenuations are the superposition from the different sound paths, including LoS sound propagation, reflected sound propagation, or even some dynamic reflected sound propagation caused by human motion. Since in the real environment, all of these sound propagation paths will always change, the ATHM system 100 can separate the signal component corresponding to the DPP 110 from signal components from these paths and remain the most stable and the shortest sound propagation path, i.e., LoS sound path, which means the sound transmitted from the loudspeaker and directly received by the microphone without any reflections. It should be noted that increasing the distance of LoS propagation will increase the sound attenuation caused by temperature and humidity change but also reduce the volume of captured ultrasound.

Two factors may affect the ultrasound speed, including ambient air temperature and ambient air humidity. Instead of measuring the ultrasound speed directly, the ATHM system 100 can measure the sound propagation Time-of-Flight (ToF) or Time-Arrival-of-Difference (TDoA) since the distance between the microphone 106 and the speaker 104 is known. That is, the ATHM system 100 can infer the sound speed using ToF or TDoA along with the distance, such as set forth in the following equations (1) and (2):

$$V_{sound}=\frac{D_{Speaker2Mic}}{T_{ToF}} \tag{1}$$

$$V_{sound}=\frac{D_{Speaker2Mic}}{T_{TDoA}} \tag{2}$$

Figures 3A, 3B, 3C:
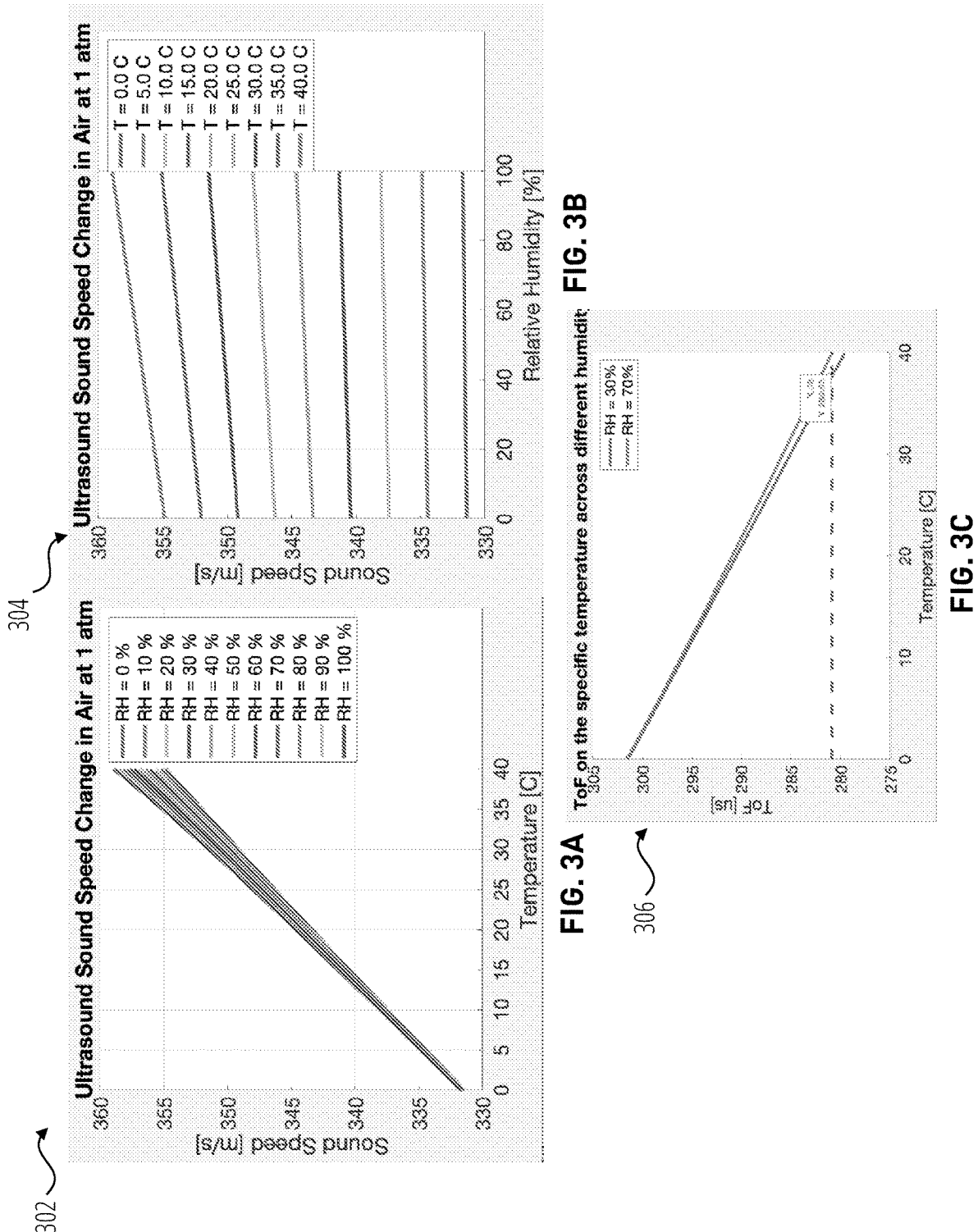
FIG. 3A is a graph showing ultrasound sound speed change in the air at 1 atmosphere (atm) across a temperature range, according to at least one embodiment.
FIG. 3B is a graph showing ultrasound sound speed change in the air at 1 atm across a humidity range, according to at least one embodiment.
FIG. 3C is a graph showing a time-of-flight (ToF) for two relative humidity values across a temperature range according to at least one embodiment.

Therefore, the distance between speaker 104 and microphone 106 (or microphones) is important for the sound speed measurement. FIG. 3A, FIG. 3B, and FIG. 3C demonstrate the sound speed (m/s) across different air temperature and humidity when fixing one factor. It should be noted that it is easier to measure the temperature change using sound speed, while it is hard to measure the humidity change using only the sound speed.

FIG. 3A is a graph 302 showing ultrasound sound speed change in the air at 1 atm across a temperature range, according to at least one embodiment. FIG. 3B is a graph 304 showing ultrasound sound speed change in the air at 1 atm across a humidity range, according to at least one embodiment. FIG. 3C is a graph 306 showing a ToF for two relative humidity values across a temperature range according to at least one embodiment. Supposing the LoS propagation distance is 0.1 m ($d=0.1$ m) and relative humidity is between 30 and 70 percent ($RH=30~70\%$), the ToF has less than 20 microseconds (us) change from 0 C to 40 C. The largest temperature measurement error caused by humidity is only 2 C, as shown in the figures. As such, in some embodiments, the ATHM system 100 can only omit the humidity factor when measuring the ambient temperature.

In at least one embodiment, the measurement of ultrasound propagation speed is based on the ToF or TDoA. The ATHM system 100 can measure the LoS ToF (or TDoA) to mitigate the interference from dynamic sound propagation distance caused by the multipath effect.

In at least one embodiment, for a fixed temperature of 30 C and a distance of 0.1 m, the TDoA (us) has the following values for different humidity percentages, as illustrated in Table 3.

TABLE 3

| | Humidity (RH) | | | | | | | |
|---|---|---|---|---|---|---|---|---|
| | 0~10% | 0~20% | 0~30% | 0~40% | 0~50% | 0~60% | 0~70% | 0~80% |
| TDOA (us) | 0.19 | 0.38 | 0.57 | 0.76 | 0.95 | 1.14 | 1.33 | 1.52 |

In at least one embodiment, for a fixed temperature of 10 C and a distance of 0.1 m, the TDoA (us) has the following values for different humidity percentages, as illustrated in Table 4.

TABLE 4

| | Humidity (RH) | | | | | | | |
|---|---|---|---|---|---|---|---|---|
| | 0~10% | 0~20% | 0~30% | 0~40% | 0~50% | 0~60% | 0~70% | 0~80% |
| TDoA (us) | 0.06 | 0.11 | 0.17 | 0.23 | 0.28 | 0.34 | 0.39 | 0.45 |

It should be noted that increasing the distance of LoS propagation will increase the TDoA or ToF caused by temperature and humidity change but also reduce the volume of captured ultrasound. The sound speed is much easier to measure the temperature than the humidity. Measuring the humidity by combining sound attenuation and propagation speed is possible. The ATHM system 100 can measure the LoS sound attenuation across different frequencies for sound attenuation. For sound speed, the ATHM system 100 can measure the LoS sound speed for a loudspeaker and microphone pair or a loudspeaker and multiple microphones. Increasing the distance of LoS propagation (or distance between multiple microphones) will increase the measurement value of sound attenuation and sound speed but will also decrease the measurement volume (i.e., signal-to-noise ratio (SNR)).

In at least one embodiment, the ATHM system 100 can measure the DPP ToF/TDoA to characterize the speed of sound and the DPP sound attenuation across different frequencies. The ATHM system 100 can separate the signal components of the direct sound propagation path from other paths and estimate the ambient temperature using the speed of sound and the ambient relative humidity by combining the speed of sound and sound attenuation characteristics. These characterizations can be features extracted from the signal component corresponding to the DPP 110. The following description introduces the feature and baseband signal selection, modulation/demodulation design, and feature extraction to achieve the estimates.

Feature and Baseband Signal Selection

Using a signal processing pipeline, different ultrasonic signals with corresponding signal processing methods can extract different features. Frequently used features in ultrasonic sensing include frequency response, Range-FFT (Fast Fourier Transform), and Impulse Response (IR). In at least one embodiment, an IR can be used to separate the signal components of the DPP from other paths. The IR can guarantee the feature distance resolution is small enough. The distance resolution of Range-FFT relies on the bandwidth B, resulting in the distance resolution $\Delta d = c \cdot B \approx 34$ cm when B=1 kHz. In comparison, the distance resolution of IR is $\Delta d = c \cdot fs = 0.36$ cm, where the speed of sound $c \approx 343$ m/s and the sampling rate fs=96 kHz. To achieve a fine-grained IR to characterize sound propagation properties, a transmitted signal with optimal autocorrelation characteristics is selected. Using the ZC sequence as the baseband signal and extracting IR from the baseband can provide the optimal autocorrelation characteristics. The ZC sequence, a chirp-like polyphase sequence, has a near-optimal autocorrelation function. The ZC sequence has other properties that can benefit the design of the ATHM system 100, including i) the autocorrelation of a ZC sequence with a cyclically shifted version of itself is zero, which avoids the gap interval design between two chirp signals; ii) the ZC sequence supports the OFDM modulation because the Discrete Fourier Transform (DFT) of a ZC sequence is another ZC sequence conjugated, scaled and time scaled, which will be used in the OFDM modulation scheme described below in FIG. 6. The impulse response can be measured in the passband or the baseband, as depicted in FIG. 4A and FIG. 4B.

Figures 4A, 4B:
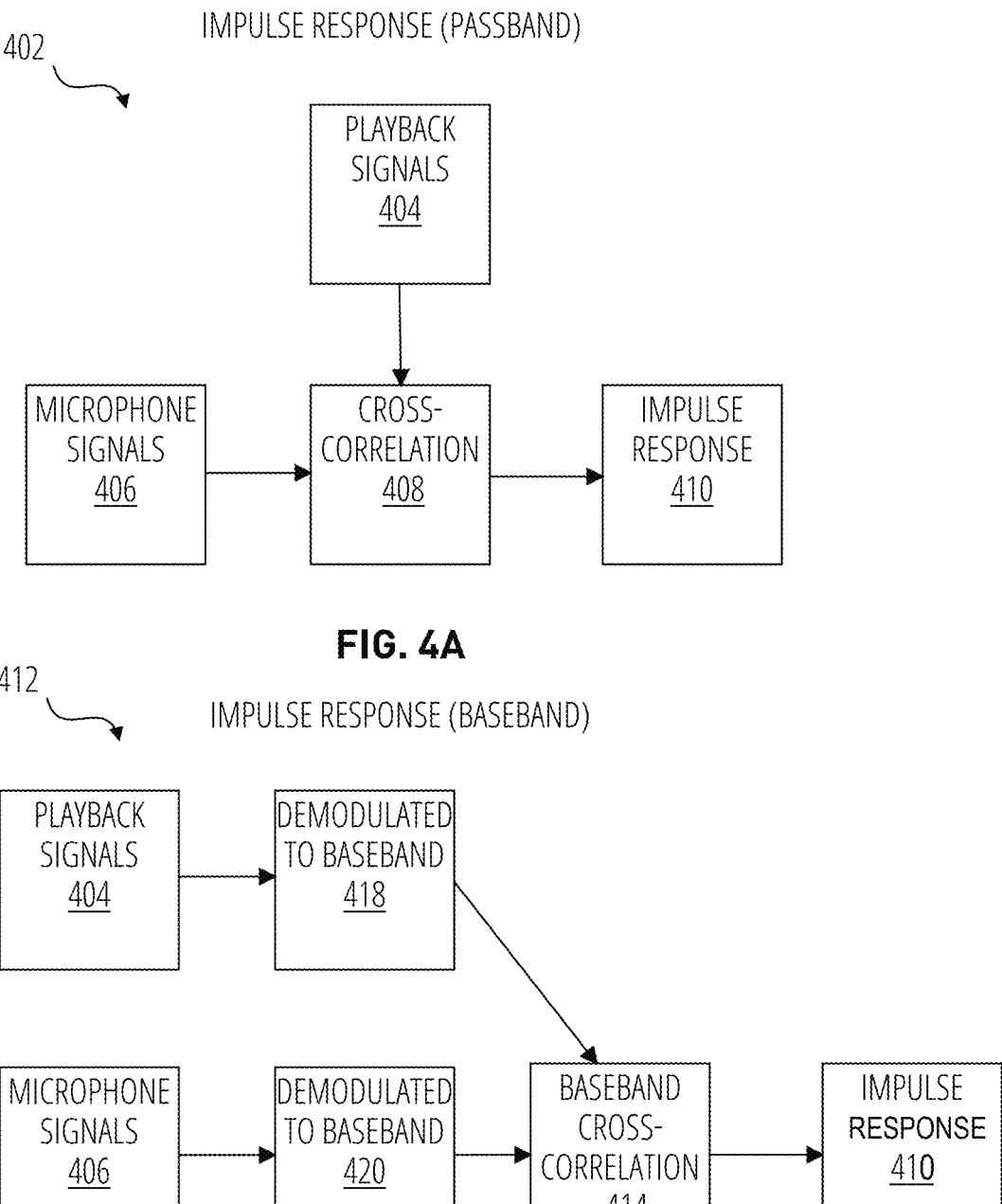
FIG. 4A is a block diagram of a processing flow of measuring the impulse response in a passband according to at least one embodiment.
FIG. 4B is a block diagram of a processing flow of measuring the impulse response in a baseband according to at least one embodiment.

FIG. 4A is a block diagram of a processing flow 402 of measuring the impulse response in a passband according to at least one embodiment. In the processing flow 402, a cross-correlation function 408 can receive the playback signals 404 and the microphone signals 406 in the passband. The processing flow 402 can then measure the impulse response 410 in the passband.

FIG. 4B is a block diagram of a processing flow 412 of measuring the impulse response in a baseband according to at least one embodiment. In the processing flow 412, the playback signals 404 can be demodulated to baseband 418, and the microphone signals 406 can be demodulated to baseband 420. A baseband cross-correlation function 414 can receive the demodulated playback signals 404 and the demodulated microphone signals 406 in the baseband. The processing flow 412 can then measure the impulse response 410 in the baseband. In at least one embodiment, the ATHM system 100 uses a chirp-like polyphase sequence modulated continuous wave using OFDM modulation across multiple sub-bands. The idea is to measure the impulse response from different sub-bands using a single-chip signal. The ATHM system 100 can measure the sound propagation speed and attenuation across different sub-bands. In another embodiment, a copy of the playback signals in the baseband can be used for the baseband cross-correlation 414 instead of demodulating the playback signals 404.

As described above, the ATHM system 100 can use the ZC sequence, given its characteristics. The ZC sequence has a near-optimal autocorrelation function, as illustrated in FIG. 5. In other embodiments, the ATHM system 100 can use other pseudorandom sequences, such as GSM, Barker, M-Sequence, or the like.

FIG. 5 is a graph 500 illustrating an autocorrelation of a ZC sequence and an autocorrelation of a frequency-modulated continuous wave (FMCW) signal, according to at least one embodiment. In radar signals, the ZC sequence is widely used as the baseband signals of the transmitted signals. Compared to other pseudorandom sequences (like Barker code, M-sequence, etc.), the advantages of using the ZC sequence are as follows: i) optimal autocorrelation characteristics from the following perspectives: ii) narrow autocorrelation main lobe width; iii) low baseband crest factor; iv) high autocorrelation gain; and v) low autocorrelation side lobe level. In an autocorrelation function comparison between different transmitted signals, the autocorrelation of a ZC sequence with a cyclically shifted version of itself is zero, so there is no need to add a gap between two chirps. The captured signals can fully use the whole bandwidth. The ZC sequence also supports the OFDM modulation. If $N_{ZC}$ is prime, the Discrete Fourier Transform of a Zadoff-Chu sequence is another Zadoff-Chu sequence conjugated, scaled and time scaled. It is convenient to modulate/demodulate the multiple baseband signals to different sub-bands of an ultrasound band. As described above, the ZC sequence can be modulated and demodulated using the OFDM modulation scheme described below with respect to FIG. 6.

Figure 6:
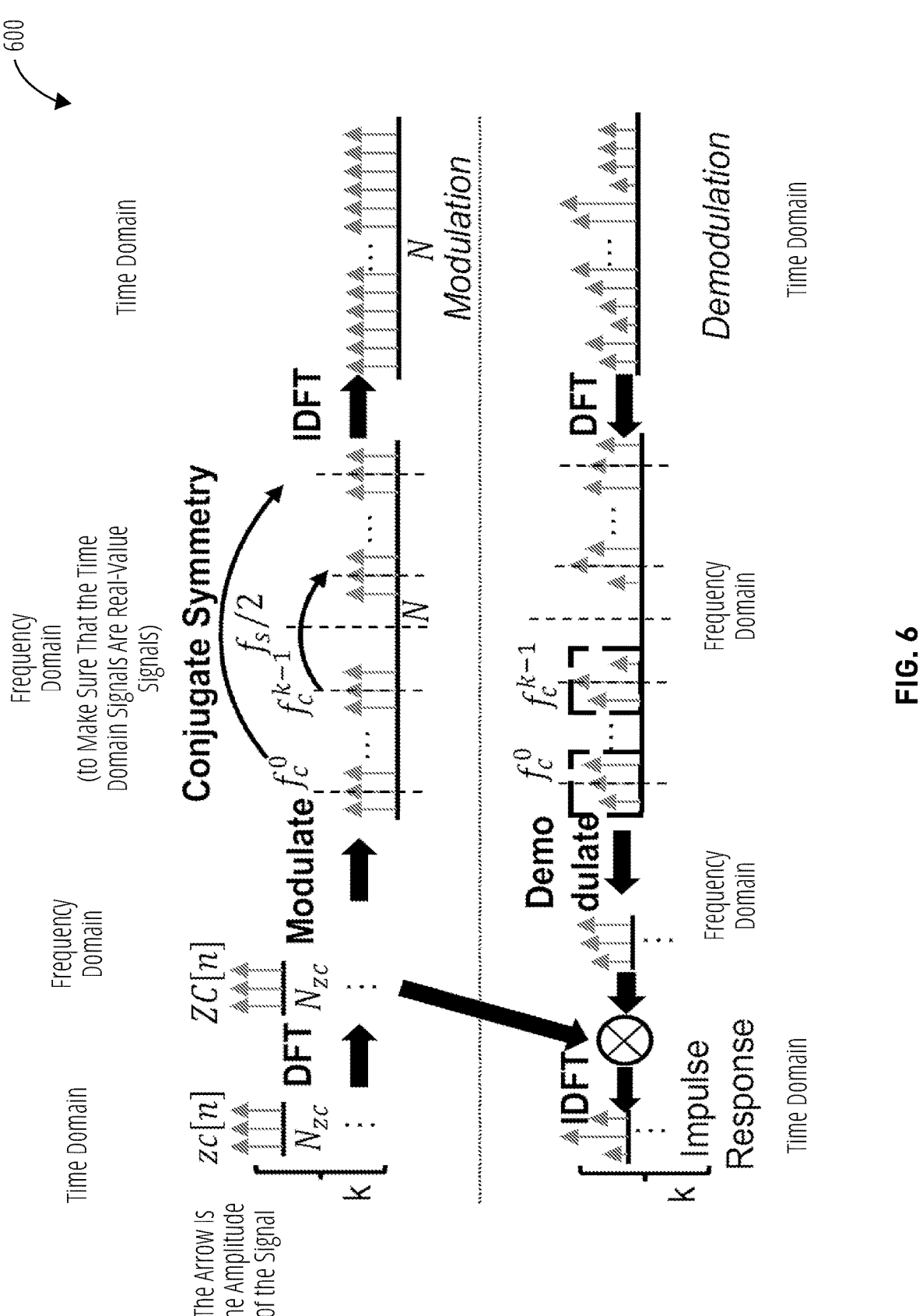
FIG. 6 illustrates an overall pipeline of ultrasound modulation and demodulation in the ATHM system according to at least one embodiment.

FIG. 6 illustrates an overall pipeline 600 of ultrasound modulation and demodulation in ATHM system 100 according to at least one embodiment. The modulation and demodulation process of the pipeline 600 is first described below for a single carrier frequency, fc. The baseband ZC sequence with a length of $N_{ZC}$ is zc[n]=exp(−j πun(n+1+2q) $N_{ZC}$), where 0≤n<$N_{ZC}$, q is a constant integer, and we use u=1 as default. 1) To modulate the ZC sequence to the ultrasonic band, the pipeline 600 converts the time domain ZC sequence, zc[n], to the frequency domain ZC[n] using DFT. 2) The pipeline 600 uses the OFDM modulation to move the baseband ZC sequence to the carrier frequency $f_c$. 3) To guarantee that the modulated signal in the time domain is a real-value signal, the pipeline 600 sets the negative frequency in the frequency domain to be the conjugate counterpart of the positive frequency parts. 4) The pipeline 600 converts the signal to the time domain using an inverse DFT (IDFT) to obtain an N-point ultrasound signal.

The demodulation procedure is the reverse of the modulation. 1). The pipeline 600 segments the received signal into frames of length N and performs DFT to convert them to the frequency domain. 2). The pipeline 600 selects the $N_{ZC}$ frequency points centered at $f_c$ of the positive frequency parts. 3). The pipeline 600 multiplies them with the conjugate of the ZC baseband signal in the frequency domain, equivalent to circular cross-convolution in the time domain. 4). Finally, the pipeline 600 performs IDFT to convert them to the time domain and extracts the complex-valued IR.

In order to measure the sound attenuation across different frequencies, the pipeline 600 uses multiple carrier frequencies, $f^i_c$, where 0≤i<k. If a single carrier frequency was excited at a time, measuring the impulse response at k number of carrier frequencies will require us to transmit k number of modulated signals. If the duration of each modulated signal is t=1.5 seconds, then the overall duration will be tall=t□k=10.5 seconds when k=7. Compared to traditional T&RH sensors, a 10-second duration for a single measurement is too long and will not only lead to large errors when T&RH values are changing quickly but also disable other ultrasonic sensing functionalities. To achieve a faster response time, the pipeline 600 measures the sound attenuation across different frequencies simultaneously by modulating the baseband signals to multiple carrier frequencies in a single excitation signal. As shown in FIG. 6, the pipeline 600 at steps 2) and 3) is modified in the modulation and demodulation processes to support multiple carrier frequencies.

For feature extraction, the duration of each modulated signal can be set to 0.5 seconds. The pipeline 600 can modulate k=7 ZC sequence to the ultrasonic band, and the carrier frequencies $f^i_c$=32+k□1.5 kHz. For each ZC sequence, the bandwidth can be set to 1 kHz and 500 Hz between two frequency bands. To avoid leakage into the audible band, the pipeline 600 can transmit three modulated signals continuously, as illustrated in FIG. 7A, and use a Hanning window to smooth the beginning and the end of the first and last modulated signals. Finally, the pipeline 600 can compute k complex-valued IRs. Since the DPP propagation properties need to be measured, the final features contain the IRs in the region of +d cm across k carrier frequencies.

In at least one embodiment, the pipeline 600 supports OFDM-based modulation and demodulation methods using the ZC sequence. The pipeline 600 can utilize the property that if $N_{ZC}$ is prime, the DFT of a Zadoff-Chu sequence is another Zadoff-Chu sequence conjugated, scaled and time scaled. The single-band ZC sequences can be modulated to the ultrasound band. The modulation of a single Zadoff-Chu sequence to a single frequency band is shown as follows, where zc[n] is the time domain baseband ZC-sequence. The ZC[n] is the baseband ZC-sequence converted to the frequency domain, where $f_c$ is the central frequency of the ultrasound band. The modulation portion of the pipeline 600 (upper portion of FIG. 6) can perform a DFT to convert the sequences to the frequency domain and modulate the baseband signals to the passband (central frequency $f_c$). The pipeline 600 can copy the conjugate symmetry to the negative frequency band to ensure that the time domain signals are real values. The modulation portion of the pipeline 600 can perform an IDFT to convert it to the time domain and use it as the transmitted signal. When the bandwidth of the ZC sequence is 1 kHz, the pulse length is 500 ms, and the sampling rate is 96 kHz. The pipeline 600 can calculate that N_{ZC}=499. If the central frequency $f_c$=36 kHz, the transmitted signals are shown in FIG. 7A.

FIG. 7A is a graph 702 illustrating amplitudes of transmitted signals based on the ZC-sequence modulated signals according to at least one embodiment. FIG. 7B is a graph 704 illustrating three ZC chirps according to at least one embodiment.

The pipeline 600 can repeat the ZC chirp three times, and the first and the last chirp can have a short Hanning window (8 ms) to prevent audible frequency leakage at the beginning and end of the transmitted signals. The frequency response of a ZC-modulated chirp is shown in FIG. 7C.

FIG. 7C is a graph 706 illustrating a frequency response of a single ZC-modulated chirp according to at least one embodiment. As described herein, the pipeline 600 can modulate the ZC sequences to multiple sub-bands, as illustrated in FIG. 8.

Figure 8:
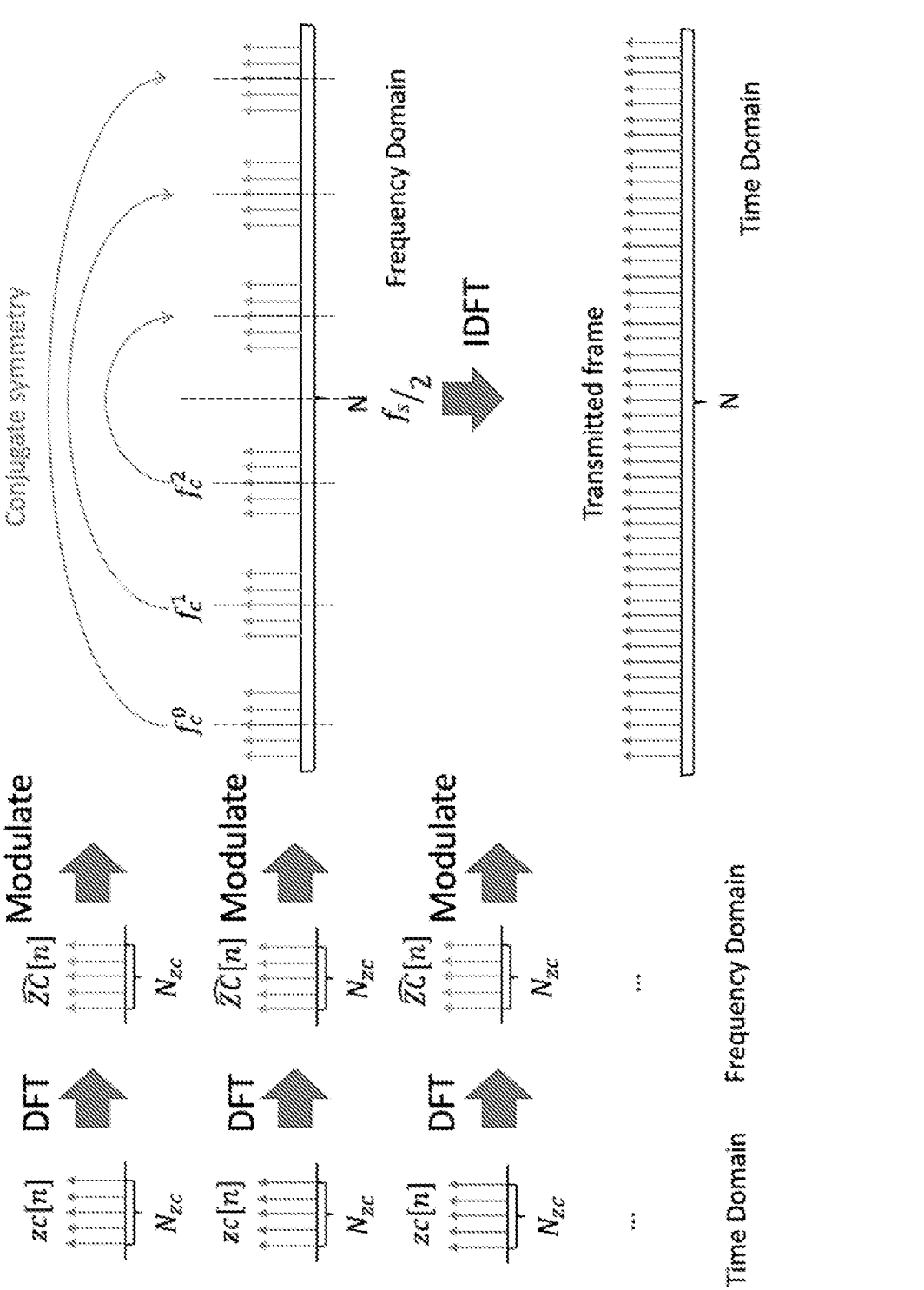
FIG. 8 illustrates modulating multiple-band ZC sequences to an ultrasound band according to at least one embodiment.

FIG. 8 illustrates modulating multiple-band ZC sequences to an ultrasound band according to at least one embodiment. To modulate the multiple-band ZC sequences to ultrasound band, the only difference is to generate multiple baseband ZC sequences in step 1) and step 2) and put them in multiple central frequencies. Example transmitted signals are illustrated in FIG. 9A, FIG. 9B, and FIG. 9C.

Figure 9A:
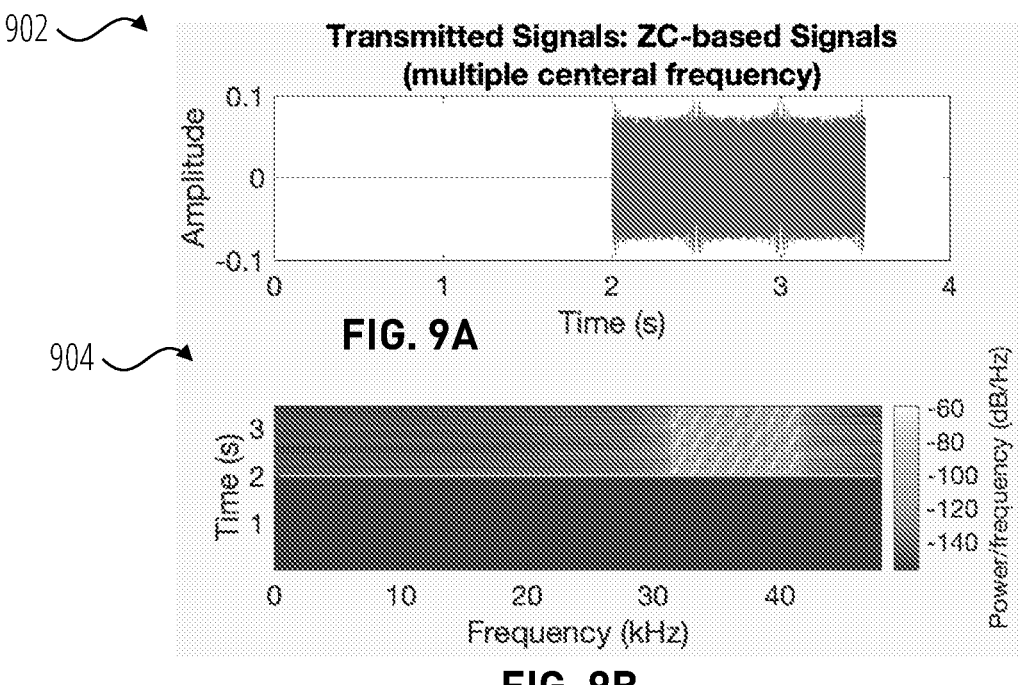
FIG. 9A is a graph illustrating amplitudes of transmitted signals based on multiple ZC-sequences modulated signals at multiple carrier frequencies according to at least one embodiment.
Figure 9B:
FIG. 9B is a graph illustrating three ZC chirps at seven carrier frequencies according to at least one embodiment.

FIG. 9A is a graph 902 illustrating amplitudes of transmitted signals based on multiple ZC-sequences modulated signals at multiple carrier frequencies according to at least one embodiment. FIG. 9B is a graph 904 illustrating three ZC chirps at seven carrier frequencies according to at least one embodiment.

The seven sub-bands (e.g., [$32e^3$, $33.5e^3$, $35e^3$, $36.5e^3$, $38e^3$, $39.5e^3$, $41e^3$]) in the illustrated embodiments each include 1 kHz bandwidth, and there is a 500 Hz gap between two adjacent sub-bands. The pipeline 600 can repeat the ZC chirp three times in each carrier frequency (also referred to as subcarriers). The first and the last chirp can have a short Hanning window (8 ms) to prevent audible frequency leakage at the beginning and end of the transmitted signals. The frequency response of the multiple ZC-modulated chirps is shown in FIG. 9C.

Figure 9C:
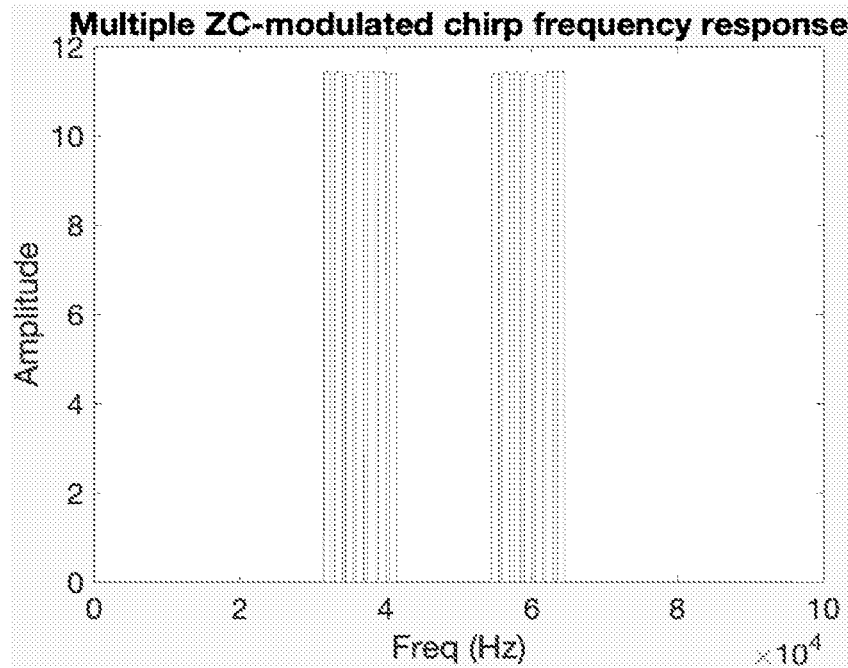
FIG. 9C is a graph illustrating a frequency response of multiple ZC-modulated chirps according to at least one embodiment.

FIG. 9C is a graph 906 illustrating a frequency response of multiple ZC-modulated chirps according to at least one embodiment.

Referring back to the demodulation portion of the pipeline 600, the pipeline 600 can perform signal demodulation and impulse response feature extraction from the transmitted signals. The demodulation portion of the pipeline 600 is the reversed version of the modulation portion. The demodulation portion of the pipeline 600 uses a bandpass filter on the received signals and performs a DFT to convert it to the frequency domain. The demodulation portion of the pipeline 600 can demodulate the positive frequency band and move it to the baseband. The demodulation portion of the pipeline 600 can perform conjugate multiplication with the transmitted baseband signals in the frequency domain. The frequency domain multiplication equals the time domain convolution. The demodulation portion of the pipeline 600 can perform an IDFT to convert it to the time domain and captures the impulse response. The results after each step are illustrated in the graphs of FIG. 10.

Figure 10:
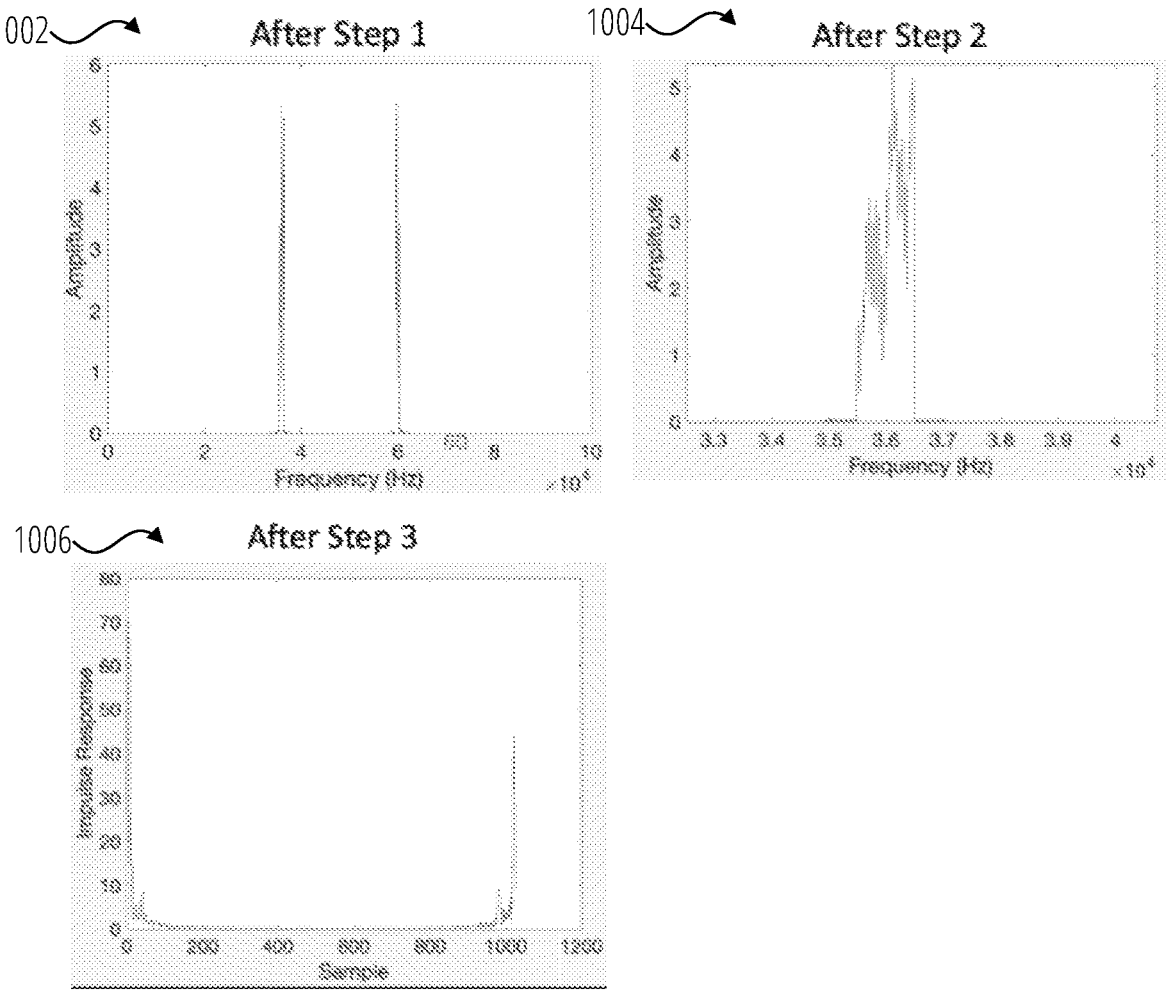
FIG. 10 illustrates graphs of the results after each step in the demodulation portion of the pipeline of FIG. 6, according to at least one embodiment.

FIG. 10 illustrates graphs of the results after each step in the demodulation portion of the pipeline of FIG. 6, according to at least one embodiment. As described above, the demodulation portion of the pipeline 600 can demodulate multiple-band ZC signals to impulse responses. FIG. 10 illustrates the results after each step in a single carrier frequency example. To demodulate the multiple-band ZC signals to each sub-band impulse response, the demodulation portion of the pipeline 600 can repeat the steps 2) thru 4) for each sub-band to obtain multiple impulse responses for each sub-band, such as illustrated in FIG. 11.

Figure 11:
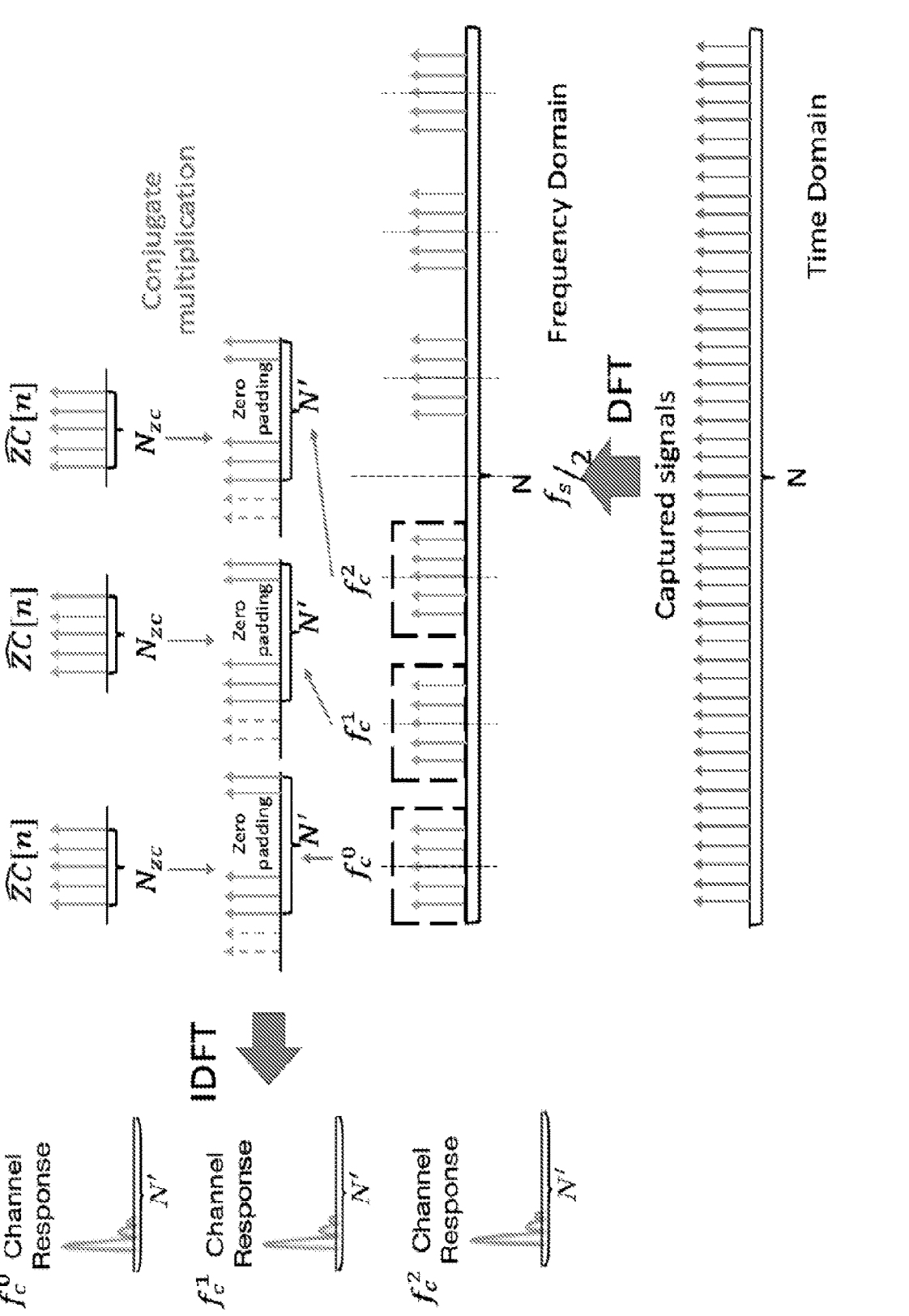
FIG. 11 shows a channel impulse response for each of the multiple sub-bands according to at least one embodiment.

FIG. 11 shows a channel impulse response for each of the multiple sub-bands according to at least one embodiment. The measured IRs can be visualized in the graphs of FIG. 12 described below for features to be input into the regression model.

Regression Model Design

Figure 12:
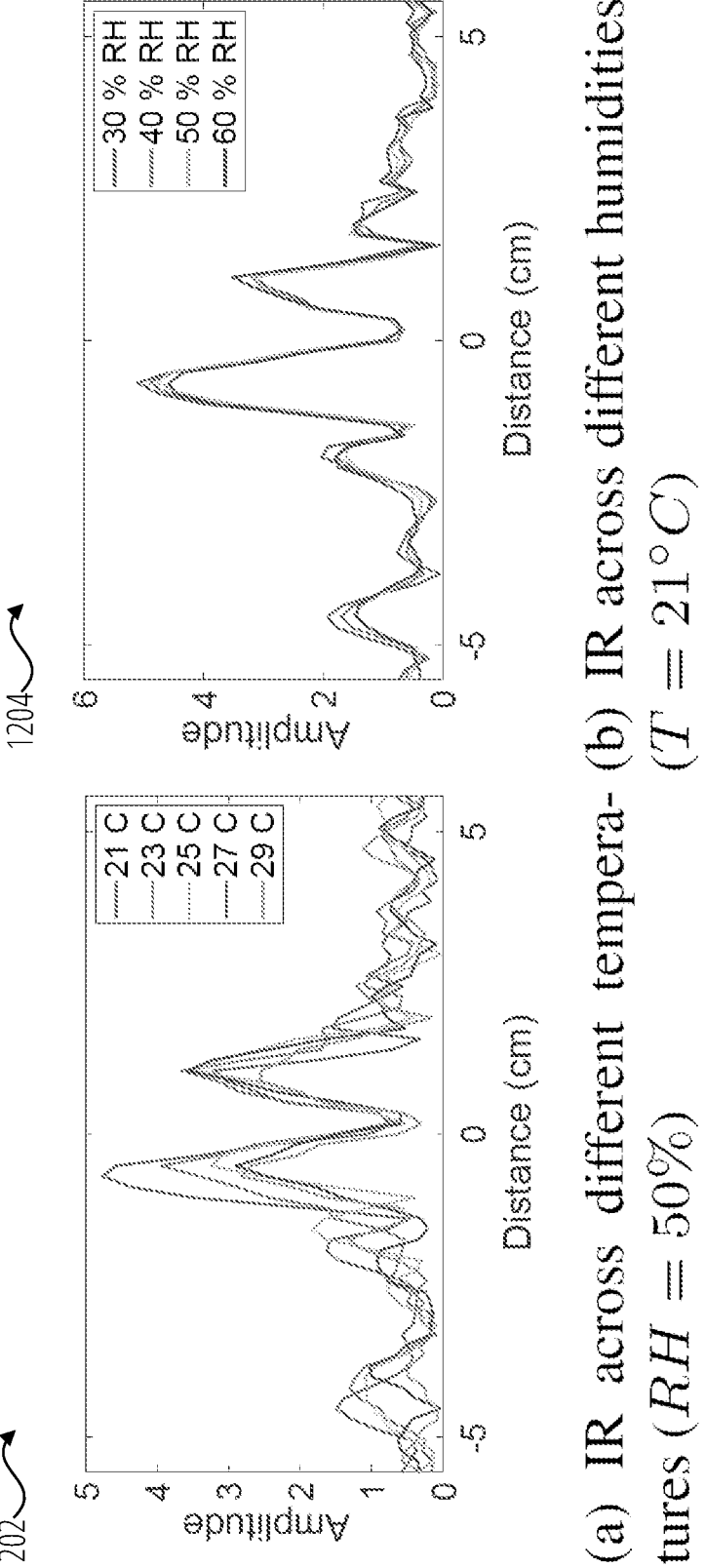
FIG. 12 are graphs showing impulse responses across different temperatures and different humidity levels, according to at least some embodiments.

The measured IRs can be visualized by fixing the temperature or humidity at a specific carrier frequency, as shown in FIG. 12.

FIG. 12 are graphs showing impulse responses across different temperatures and different humidity levels, according to at least some embodiments. In particular, graph 1202 shows the amplitude of the impulse response as a function of distance for five different temperatures with a relative humidity fixed at 50%. Graph 1204 shows the amplitude of the impulse response as a function of distance for four relative humidity levels with a fixed temperature of 21° C. As shown in FIG. 12, when the humidity changes, the impulse response changes in amplitude due to the sound attenuation change. In contrast, when temperature change leads to a change in the impulse response waveform due to the change in speed of sound. For example, the largest sound attenuation in the measured impulse responses is when Fc=41 kHz, the temperature is 29° C., and the humidity is 60% RH.

In at least one embodiment, the ATHM system 100 can use regression models to estimate the ambient T&RH values. In at least one embodiment, two regression models can be used for temperature and relative humidity, respectively. However, humidity does not significantly affect the speed of sound. So, in other embodiments, a faster two-step T&RH co-regression method can first estimate the temperature by training a temperature regression model and then train multiple humidity regression models under different temperatures. The ATHM system 100 can first estimate the temperature using the temperature regression model. Then, the ATHM system 100 can take the estimated temperature as the input to find the humidity regression model with the closest temperature. The ATHM system 100 can then estimate the humidity values using the specific humidity regression model. The regression models can be linear regression models, polynomial linear regression models, Support Vector Registration (SVR) models, decision-tree regression models, K-Nearest Neighbors (KNN) regression models, random forest regression models, AdaBoost regression models, GradientBoost regression models, or the like. In at least one embodiment, all the hyper parameters are optimized by random search over the parameter settings. An example of the two-step co-regression method is illustrated in FIG. 13.

Figure 13:
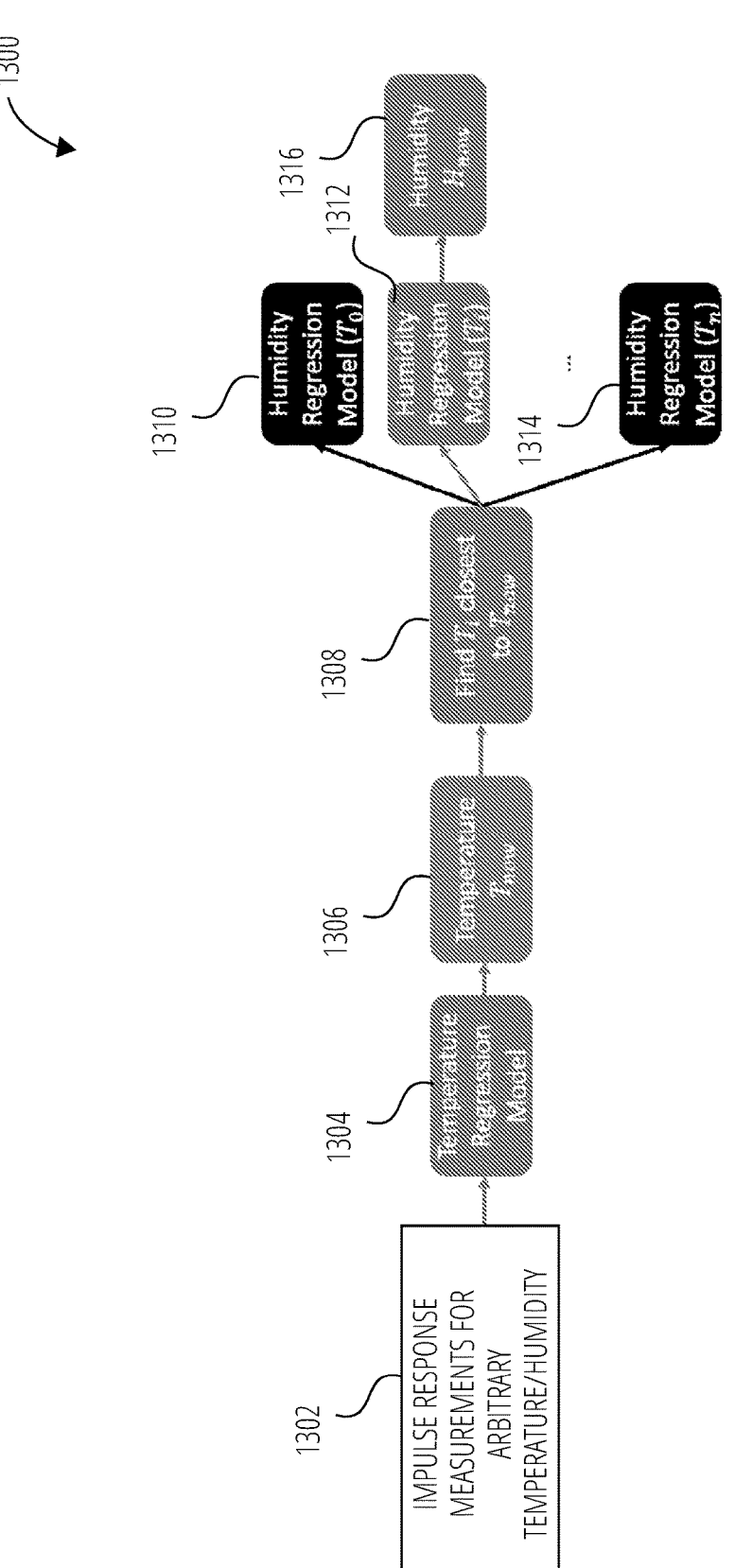
FIG. 13 is a flow diagram of a two-step co-regression method according to at least one embodiment.

FIG. 13 is a flow diagram of a two-step co-regression method 1300 according to at least one embodiment. In the two-step co-regression method 1300, impulse response measurements for arbitrary temperature and relative humidity 1302 are input into a temperature regression model (also referred to as a temperature regression sub-model sub-model) to estimate an ambient temperature value 1306. The ambient temperature value 1306 can be used as an input to a process 1308 to find a humidity regression model (also referred to as a humidity regression sub-model) from among multiple humidity regression models 1310, 1312, 1314 that is closest in temperature to the ambient temperature value 1306. The humidity regression models 1310, 1312, 1314, can be trained for different temperature values. The relative humidity value 1316 can be estimated with the closest humidity regression model 1310. The trained temperature regression model 1304 and the trained humidity regression models 1310, 1312, 1314, can be deployed in the ATHM system 100 of a device.

In at least one embodiment, the regression model 120 of FIG. 1 can include multiple sub-models trained with the two-step co-regression method described above. The ATHM system 100 can estimate the ambient temperature value using a trained temperature regression sub-model of the regression model based only on the first sound propagation property. The ATHM system 100 can estimate the relative humidity value using a trained humidity regression sub-model of the regression model corresponding to the ambient temperature value based on the first sound propagation property and the second sound propagation properties.

Figure 14:
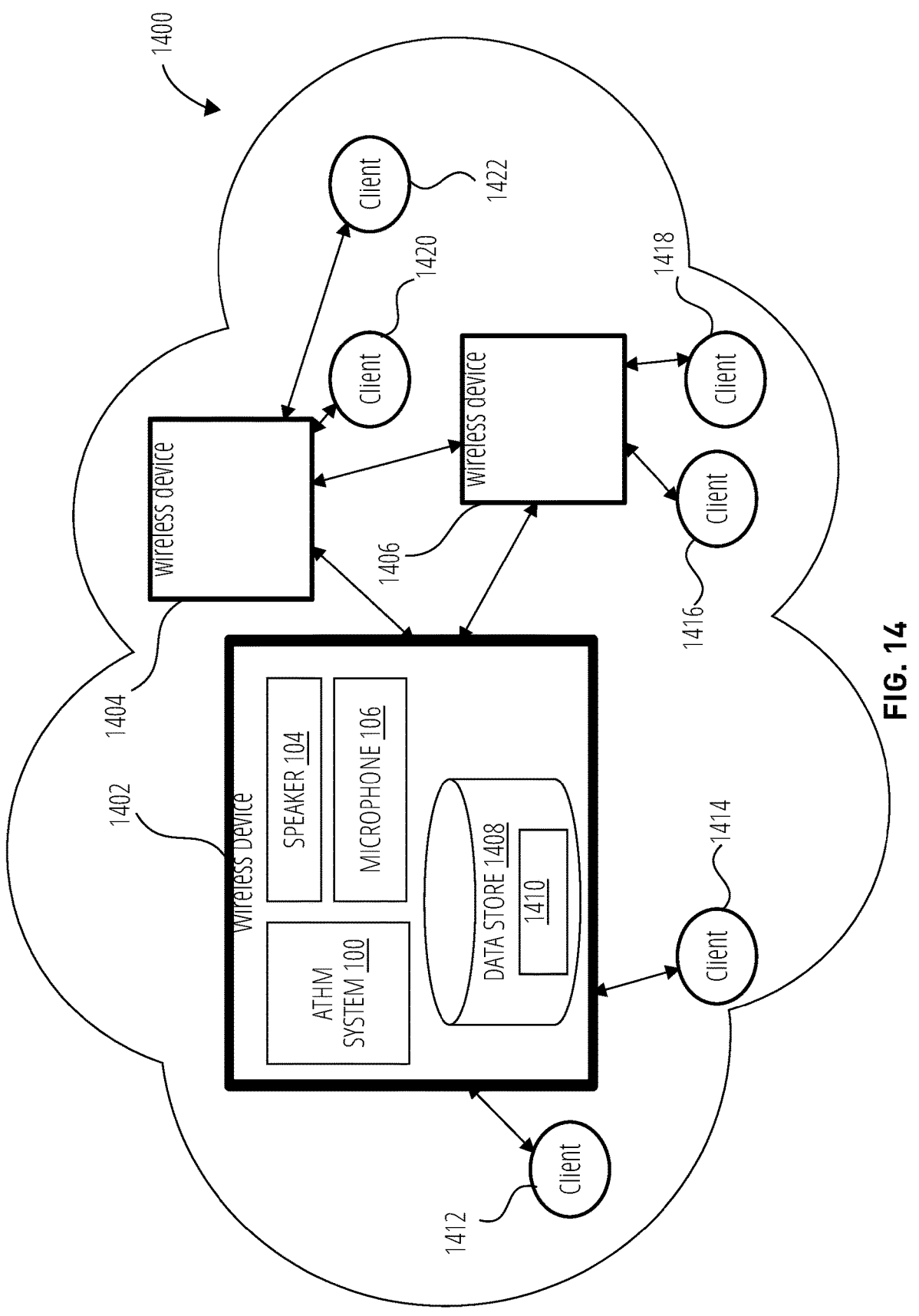
FIG. 14 is a network diagram of wireless devices in a wireless network with ATHM system 100 for ATHM based on ultrasound signals, according to at least one embodiment.

FIG. 14 is a network diagram of wireless devices in a wireless network 1400 with ATHM system 100 for ATHM based on ultrasound signals, according to at least one embodiment. The wireless network 1400 includes a first wireless device 1402, a second wireless device 1404, and a third wireless device 1406. Each of the wireless devices 1402, 1404, 1406 can be access point (AP) devices in the wireless network 1400 and can provide network access to one or more endpoint devices (also referred to as client devices), such as client devices 1412, 1414, 1416, 1418, 1420, and 1422, respectively. Alternatively, the wireless devices 1402, 1404, and 1406 can be endpoint devices that are not connected to downstream devices. The first wireless device 1402 includes one or more processors, one or more radios, and a data store 1408. In at least one embodiment, the wireless network 1400 is a wireless local area network (WLAN), and the first wireless device 1402 includes a WLAN radio. Alternatively, the wireless network 1400 is another type of wireless network.

The first wireless device 1402 also includes ATHM system 100, speaker 104, microphone 106, and data store 1408. In at least one embodiment, the first wireless device 1402 includes a wireless radio coupled to a processor (not illustrated in FIG. 14). In at least one embodiment, the ATHM system 100 is stored as a set of instructions in a memory device of the wireless device 1402. Alternatively, the first wireless device 1402 includes processing logic comprising hardware, software, firmware, or any combination thereof to perform the operations of the ATHM system 100. The wireless device 1402 has ultrasound capability to estimate ambient temperature and relative humidity values based on ultrasound signals transmitted between speaker 104 and microphone 106. The ATHM system 100 can store a trained regression model 1410 in data store 1408. Storing the trained regression model 1410 locally in the wireless network 1400 can be used by ATHM system 100 to estimate an ambient temperature value and a relative humidity value. The wireless device 1402 can share the estimated ambient temperature value and relative humidity value with the other wireless devices 1404 and 1406. The wireless device s 1404 and 1406 can also include instances of ATHM system 100. The wireless device 1402 can share the trained regression model 1410 with the other wireless devices 1404 and 1406. In at least one embodiment, the trained regression model 1410 includes a trained temperature regression sub-model and multiple trained humidity regression sub-models for multiple temperatures. In at least one embodiment, the ATHM system 100 can broadcast the estimated ambient temperature value and relative humidity value in an information element of its beacon frame, such as over the 2.4 GHz frequency band. Alternatively, the ATHM system 100 can share the estimated ambient temperature and relative humidity values in other ways.

FIG. 15 is a flow diagram of a method 1500 of determining an ambient temperature value and a relative humidity value using ultrasound signals according to at least one embodiment. The method 1500 may be performed by processing logic that comprises hardware (e.g., circuitry, dedicated logic, programmable logic, microcode, etc.), software, firmware, or a combination thereof. In one embodiment, the method 1500 may be performed by the ATHM system 100 of FIG. 1. In another, the method 1500 may be performed by device 102 of FIG. 1. In another, portions of the method 1500 can be performed by pipeline 600 of FIG. 6. In another, the method 1500 may be performed by two-step co-regression method 1300 of FIG. 13. In another, the method 1500 can be performed by any of the wireless devices 1402, 1404, 1406 of FIG. 14.

Referring to FIG. 15, the method 1500 begins with the processing logic emitting an ultrasound signal using a speaker in an environment around a device having the speaker (block 1502). In at least one embodiment, the ultrasound signal is a single chirp comprising a ZC sequence modulated using an OFDM modulation scheme. The processing logic determines, using the ultrasound signal received via a microphone, a signal component corresponding to a direct propagation path (DPP) between the speaker and the microphone (block 1504). At block 1506, the processing logic determines, using the signal component, a first sound propagation property representing a sound speed of the ultrasound signal along the DPP. In at least one embodiment, the first sound propagation property is at least one of a ToF value or a TDoA value. At block 1508, the processing logic determines, using the signal component across different frequency bands, second sound propagation properties, each representing a sound attenuation of the ultrasound signal along the DPP in the respective frequency band. The processing logic determines an ambient temperature value and a relative humidity value using a regression model based on the first sound propagation property and the second sound propagation properties (block 1510).

In a further embodiment, the processing logic can determine the ambient temperature value and the relative humidity value at block 1510 by estimating the ambient temperature value using the regression model based only on the first sound propagation property and estimating the relative humidity value using the regression model based on the ambient temperature value and a combination of the first sound propagation property and the second sound propagation properties.

In a further embodiment, the processing logic can generate the ultrasound signal by generating a first baseband signal, including the ZC sequence in a time domain. The processing logic converts the ZC sequence in the time domain to a frequency-domain ZC sequence in a frequency domain using a DFT. The processing logic modulates the frequency-domain ZC sequence using the OFDM modulation scheme at multiple carrier frequencies to obtain a modulated signal, where a negative frequency point in the frequency-domain ZC sequence is set to a conjugate counterpart of a positive frequency point. The processing logic converts the modulated signal in the frequency domain to the ultrasound signal in the time domain using an IDFT, where the ultrasound signal is an N-point ultrasound signal.

In a further embodiment, the processing logic can extract the signal component by segmenting the ultrasound signal into frames. Using a DFT, the processing logic can convert the frames from the time domain to the frequency domain. The processing logic can demodulate the frames with the time-domain ZC sequence at the multiple carrier frequencies to obtain a demodulated signal in the frequency domain. The processing logic converts the demodulated signal to a second baseband signal in the time domain using an IDFT. The processing logic extracts a set of complex-valued impulse responses (IRs) from the second baseband signal, each complex-value IR corresponding to one of the multiple carrier frequencies. The processing logic determines the first sound propagation property and the second sound propagation properties at block 1510 from the set of complex-valued IRs.

In a further embodiment, the processing logic can determine the first sound propagation property and the second sound propagation properties at block 1510 by estimating the ambient temperature value using a trained temperature regression sub-model of the regression model based only on the first sound propagation property, and estimating the relative humidity value using a trained humidity regression sub-model of the regression model corresponding to the ambient temperature value based on the first sound propagation property and the second sound propagation properties.

In a further embodiment, the processing logic can determine the first sound propagation property and the second sound propagation properties at block 1510 by estimating the ambient temperature value using a trained temperature regression sub-model of the regression model based only on the first sound propagation property. The processing logic can identify a trained humidity regression sub-model from a plurality of trained humidity regression sub-models using the ambient temperature value. The processing logic can estimate the relative humidity value using the trained humidity regression sub-model based on the first and second sound propagation properties.

FIG. 16 is a flow diagram of a method 1600 of determining an ambient temperature value and a relative humidity value using ultrasound signals according to at least one embodiment. The method 1600 may be performed by processing logic that comprises hardware (e.g., circuitry, dedicated logic, programmable logic, microcode, etc.), software, firmware, or a combination thereof. In one embodiment, the method 1600 may be performed by the ATHM system 100 of FIG. 1. In another, the method 1600 may be performed by device 102 of FIG. 1. In another, portions of the method 1600 can be performed by pipeline 600 of FIG. 6. In another, the method 1600 may be performed by two-step co-regression method 1300 of FIG. 13. In another, the method 1600 can be performed by any of the wireless devices 1402, 1404, 1406 of FIG. 14.

Referring to FIG. 16, the method 1600 begins with the processing logic emitting an ultrasound signal using a speaker in an environment around a device having the speaker (block 1602). In at least one embodiment, the ultrasound signal is a single chirp comprising a ZC sequence modulated using an OFDM modulation scheme. At block 1604, the processing logic determines, using the ultrasound signal, a signal component corresponding to a direct propagation path (DPP) between the speaker and the microphone. The processing logic determines, using the signal component, a first sound propagation property representing a sound speed of the ultrasound signal along the DPP (block 1606). In at least one embodiment, the first sound propagation property is at least one of a ToF value or a TDoA value. At block 1608, the processing logic determines, using the signal component across different frequency bands, second sound propagation properties, each representing a sound attenuation of the ultrasound signal along the DPP in the respective frequency band. At block 1610, the processing logic estimates an ambient temperature value using a first regression model based only on the first sound propagation property. At block 1612, the processing logic estimates a relative humidity value using a second regression model corresponding to the ambient temperature value based on the first sound propagation property and the second sound propagation properties.

In a further embodiment, before block 1602, the processing logic generates the ultrasound signal by generating a first baseband signal, including the ZC sequence in a time domain. The processing logic converts the ZC sequence in the time domain to a frequency-domain ZC sequence in a frequency domain using a DFT. The processing logic modulates the frequency-domain ZC sequence using the OFDM modulation scheme at multiple carrier frequencies to obtain a modulated signal, where a negative frequency point in the frequency-domain ZC sequence is set to a conjugate counterpart of a positive frequency point. The processing logic converts the modulated signal in the frequency domain to the ultrasound signal in the time domain using an IDFT, where the ultrasound signal is an N-point ultrasound signal.

In a further embodiment, the processing logic extracts the signal component by segmenting the ultrasound signal into frames. The processing logic converts the frames from the time domain to the frequency domain using a DFT and demodulating the frames with the time-domain ZC sequence at the multiple carrier frequencies to obtain a demodulated signal in the frequency domain. The processing logic converts the demodulated signal to a second baseband signal in the time domain using an IDFT. The processing logic extracts a set of complex-valued IRs from the second baseband signal, each complex-value IR corresponding to one of the multiple carrier frequencies. The processing logic determines the first sound propagation property and the second sound propagation properties at block 1614 from the set of complex-valued IRs.

Figure 17:
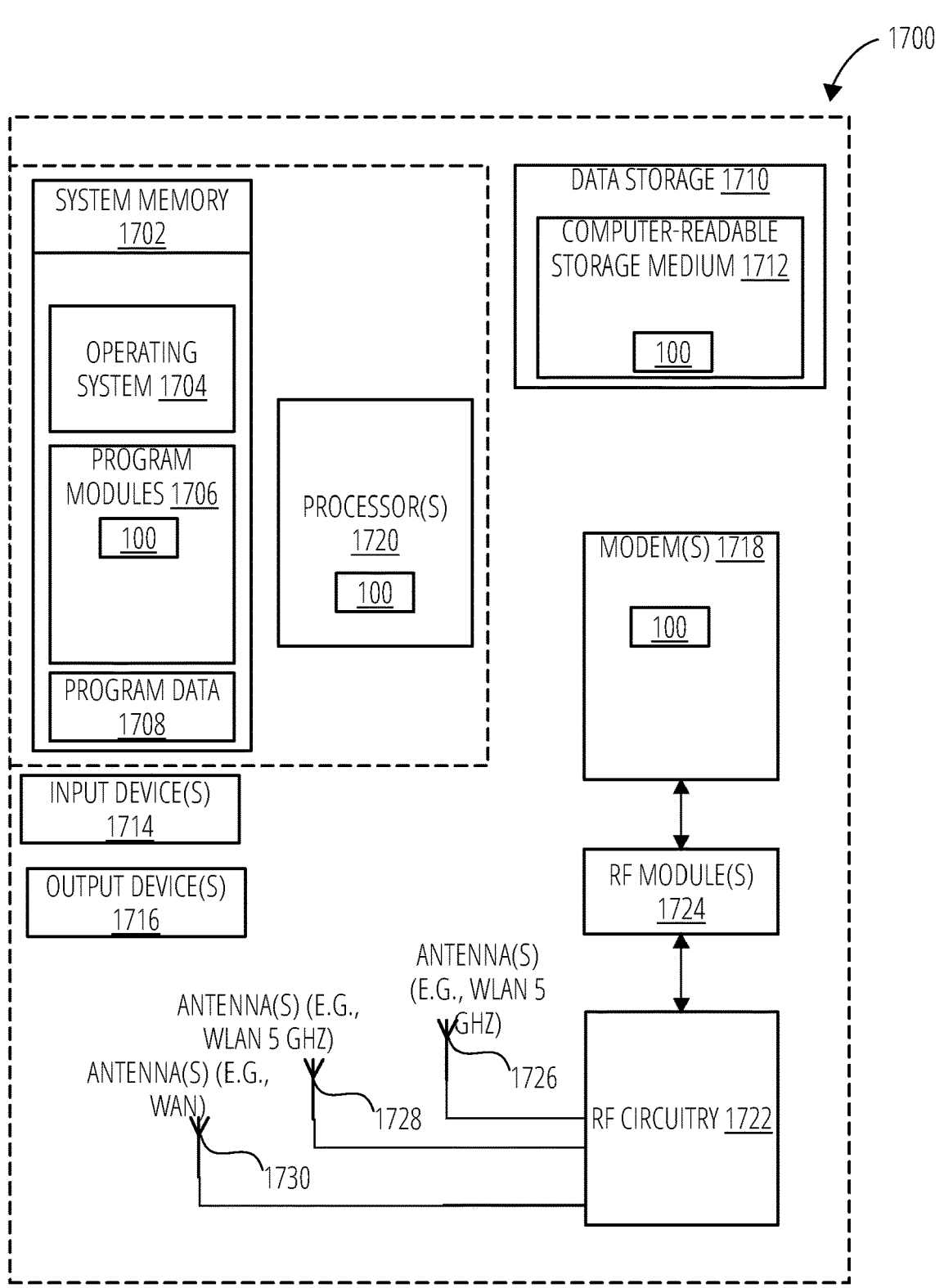
FIG. 17 is a block diagram of a wireless device with the ATHM system according to one embodiment.

FIG. 17 is a block diagram of a wireless device 1700 with ATHM system 100 according to one embodiment. The wireless device 1700 may correspond to the wireless devices described above with respect to FIG. 14. Alternatively, the wireless device 1700 may be other electronic devices, as described herein.

The wireless device 1700 includes one or more processor(s) 1720, such as one or more central processing units (CPUs), microcontrollers, field programmable gate arrays, or other types of processors. The wireless device 1700 also includes system memory 1702, which may correspond to any combination of volatile and/or non-volatile storage mechanisms. The system memory 1702 stores information that provides an operating system 1704, various program modules 1706, program data 1708, and/or other components. In one embodiment, the system memory 1702 stores instructions of methods to control the operation of the wireless device 1700. The wireless device 1700 performs functions using the processor(s) 1720 to execute instructions provided by the system memory 1702. In one embodiment, the program modules 1706 may include ATHM system 100. The ATHM system 100 may perform some of the operations of the processes described herein.

The wireless device 1700 also includes a data storage device 1710 that may be composed of one or more types of removable storage and/or one or more types of non-removable storage. The data storage device 1710 includes a computer-readable storage medium 1712 on which is stored one or more sets of instructions embodying any of the methodologies or functions described herein. Instructions for the program modules 1706 (e.g., ATHM system 100) may reside, completely or at least partially, within the computer-readable storage medium 1712, system memory 1702 and/or within the processor(s) 1720 during execution thereof by the wireless device 1700, the system memory 1702 and the processor(s) 1720 also constituting computer-readable media. The wireless device 1700 may also include one or more input devices 1118 (keyboard, mouse device, specialized selection keys, etc.), and one or more output devices 1120 (displays, printers, audio output mechanisms, etc.).

The wireless device 1700 further includes a modem 1718 to allow the wireless device 1700 to communicate via a wireless connection (e.g., such as provided by the wireless communication system) with other computing devices, such as remote computers, an item-providing system, and so forth. The modem 1718 can be connected to one or more radio frequency (RF) modules 1724. The RF modules 1724 may be a WLAN module, a wide area network (WAN) module, a personal area network (PAN) module, Global Positioning System (GPS) module, or the like. The antenna structures (antenna(s) 1726, 1728, 1730,) are coupled to the RF circuitry 1722, which is coupled to the modem 1718. The RF circuitry 1722 may include radio front-end circuitry, antenna switching circuitry, impedance matching circuitry, or the like. The antennas 1726 may be GPS antennas, Near Field Communication (NFC) antennas, other WAN antennas, WLAN or PAN antennas, or the like. The modem 1718 allows the wireless device 1700 to manage both voice and non-voice communications (such as communications for text messages, multimedia messages, media downloads, web browsing, etc.) with a wireless communication system. The modem 1122 may provide network connectivity using any type of mobile network technology including, for example, cellular digital packet data (CDPD), general packet radio service (GPRS), EDGE, universal mobile telecommunications system (UMTS), 1 times radio transmission technology (1×RTT), evaluation data optimized (EVDO), high-speed down-link packet access (HSDPA), Wi-Fi®, Long Term Evolution (LTE) and LTE Advanced (sometimes generally referred to as 4G), etc.

The modem 1718 may generate signals and send these signals to antenna(s) 1726 of a first type (e.g., WLAN 5 GHZ), antenna(s) 1728 of a second type (e.g., WLAN 2.4 GHZ), and/or antenna(s) 1730 of a third type (e.g., WAN), via RF circuitry 1722, and RF module(s) 1724 as descried herein. Antennas 1726, 1728, 1730, may be configured to transmit in different frequency bands and/or using different wireless communication protocols. The antennas 1726, 1728, 1730, may be directional, omnidirectional, or non-directional antennas. In addition to sending data, antennas 1726, 1728, 1730, may also receive data, which is sent to appropriate RF modules connected to the antennas. One of the antennas 1726, 1728, 1730 may be any combination of the antenna structures described herein.

In one embodiment, the wireless device 1700 establishes a first connection using a first wireless communication protocol, and a second connection using a different wireless communication protocol. The first wireless connection and second wireless connection may be active concurrently, for example, if a network hardware device is receiving a media item from another network hardware device (e.g., a mini-POP node) via the first connection) and transferring a file to another electronic device (e.g., via the second connection) at the same time. Alternatively, the two connections may be active concurrently during wireless communications with multiple devices. In one embodiment, the first wireless connection is associated with a first resonant mode of an antenna structure that operates at a first frequency band, and the second wireless connection is associated with a second resonant mode of the antenna structure that operates at a second frequency band. In another embodiment, the first wireless connection is associated with a first antenna structure, and the second wireless connection is associated with a second antenna. In other embodiments, the first wireless connection may be associated with content distribution within mesh nodes of a wireless mesh network, and the second wireless connection may be associated with serving a content file to a client consumption device, as described herein.

Though a modem 1718 is shown to control transmission and reception via an antenna (1726, 1728, 1730), the wireless device 1700 may alternatively include multiple modems, each of which is configured to transmit/receive data via a different antenna and/or wireless transmission protocol.

FIG. 18A is a graph 1800 illustrating the results of a temperature regression model according to one embodiment.

Figure 18B:
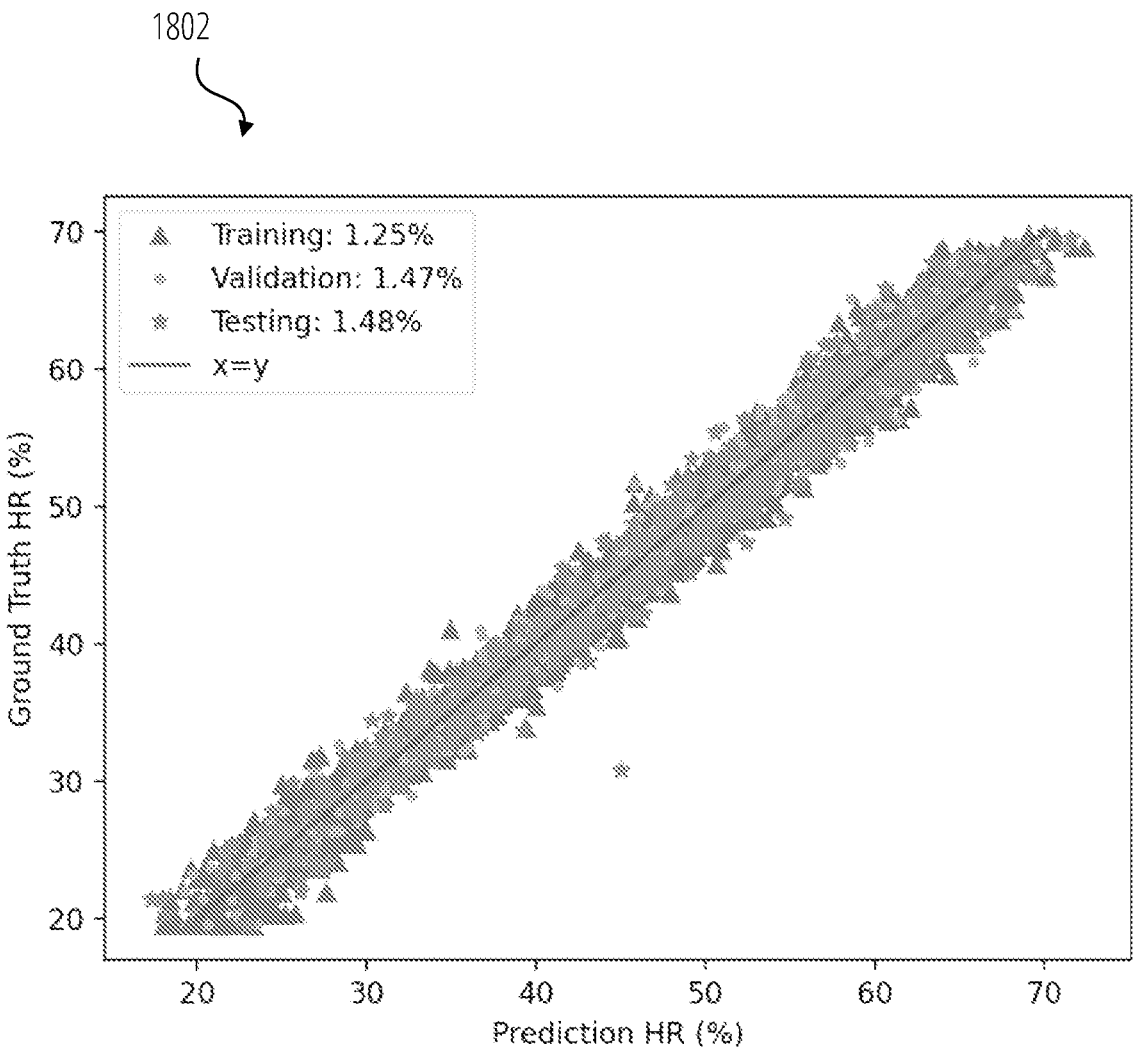
FIG. 18B is a graph illustrating the results of a humidity regression model according to one embodiment.

FIG. 18B is a graph 1802 illustrating the results of a humidity regression model according to one embodiment.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to convey the substance of their work most effectively to others skilled in the art. An algorithm can be a self-consistent sequence of steps leading to the desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer-readable storage medium, such as, but not limited to, any type of disk, including floppy disks, optical disks, CD-ROMs and magnetic-optical disks, read-only memories (ROMs), random access memories (RAMs), EPROMS, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present embodiments as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:
1. A device comprising:
a speaker;
a microphone; and
a processing device coupled to the speaker and the microphone, wherein the device is configured to:

emit, using the speaker, an ultrasound signal in an environment around the device, wherein the ultrasound signal is a single chirp comprising a Zadoff-Chu (ZC) sequence modulated using an Orthogonal Frequency-Division Multiplexing (OFDM) modulation scheme;

determine, using the ultrasound signal received via the microphone, a signal component corresponding to a direct propagation path (DPP) between the speaker and the microphone;

determine, using the signal component, a first sound propagation property representing a speed of the ultrasound signal along the DPP;

determine, using the signal component, second sound propagation properties, wherein each sound propagation property of the second sound propagation properties represents a sound attenuation of the ultrasound signal along the DPP in a respective frequency band of a plurality of frequency bands; and determine an ambient temperature value and a relative humidity value of the environment based on the first sound propagation property and the second sound propagation properties.

2. The device of claim 1, wherein the first sound propagation property is at least one of a Time-of-Flight (ToF) value or a Time-Difference-of-Arrival (TDoA) value.

3. The device of claim 1, wherein to determine the ambient temperature value and the relative humidity value, the device:

estimates the ambient temperature value based only on the first sound propagation property; and estimates the relative humidity value based on the first sound propagation property and the second sound propagation properties.

4. The device of claim 1, wherein the device is further configured to:

generate a first baseband signal comprising the ZC sequence in a time domain;

convert the ZC sequence in the time domain to a frequency-domain ZC sequence using a Discrete Fourier Transform (DFT);

modulate the frequency-domain ZC sequence using the OFDM modulation scheme at multiple carrier frequencies to obtain multiple modulated signals, wherein a negative frequency point in the frequency-domain ZC sequence is set to a conjugate counterpart of a positive frequency point; and convert the multiple modulated signals to the ultrasound signal in the time domain using an inverse DFT (IDFT), wherein the ultrasound signal is an N-point ultrasound signal.

5. The device of claim 1, wherein to extract the signal component, the device is further configured to:

segment the ultrasound signal into frames;

convert the frames from time domain to frequency domain;

demodulate the frames with a time-domain ZC sequence at multiple carrier frequencies to obtain multiple demodulated signals in the frequency domain;

convert the multiple demodulated signals to multiple baseband signals in the time domain; and extract a set of complex-valued impulse responses (IRs) from each of the multiple baseband signals, each set of complex-value IRs corresponding to one of the multiple carrier frequencies.

6. The device of claim 1, wherein the device is further configured to:

estimate the ambient temperature value using a first regression model based only on the first sound propagation property; and estimate the relative humidity value using a second regression model corresponding to the ambient temperature value and based on the first sound propagation property and the second sound propagation properties.

7. A method comprising:

emitting, using a speaker of a device, an ultrasound signal in an environment around the device, wherein the ultrasound signal is a single chirp comprising a Zadoff-Chu (ZC) sequence modulated using an Orthogonal Frequency-Division Multiplexing (OFDM) modulation scheme;

determining, using the ultrasound signal received via a microphone of the device, a signal component corresponding to a direct propagation path (DPP) between the speaker and the microphone;

determining, using the signal component, a first sound propagation property representing a speed of the ultrasound signal along the DPP;

determining, using the signal component, second sound propagation properties, wherein sound propagation property of the second sound propagation properties represents a sound attenuation of the ultrasound signal along the DPP in a respective frequency band of a plurality of frequency bands; and determining an ambient temperature value and a relative humidity value of the environment based on the first sound propagation property and the second sound propagation properties.

8. The method of claim 7, wherein the first sound propagation property is at least one of a Time-of-Flight (ToF) value or a Time-Difference-of-Arrival (TDoA) value.

9. The method of claim 7, wherein determining the ambient temperature value and the relative humidity value comprises:

estimating the ambient temperature value based only on the first sound propagation property; and estimating the relative humidity value based on the first sound propagation property and the second sound propagation properties.

10. The method of claim 7, wherein generating the ultrasound signal comprises:

generating a first baseband signal comprising the ZC sequence in a time domain;

converting the ZC sequence in the time domain to a frequency-domain ZC sequence using a Discrete Fourier Transform (DFT);

modulating the frequency-domain ZC sequence using the OFDM modulation scheme at multiple carrier frequencies to obtain multiple modulated signals, wherein a negative frequency point in the frequency-domain ZC sequence is set to a conjugate counterpart of a positive frequency point; and converting the multiple modulated signals to the ultrasound signal in the time domain using an inverse DFT (IDFT), wherein the ultrasound signal is an N-point ultrasound signal.

11. The method of claim 7, wherein extracting the signal component comprises:

segmenting the ultrasound signal into frames;

converting the frames from time domain to frequency domain;

demodulating the frames with a time-domain ZC sequence at multiple carrier frequencies to obtain multiple demodulated signals in the frequency domain;

converting the multiple demodulated signals to multiple baseband signals in the time domain; and extracting a set of complex-valued impulse responses (IRs) from each of the multiple baseband signals, each set of complex-value IRs corresponding to one of the multiple carrier frequencies.

12. The method of claim 7, wherein determining the first sound propagation property and the second sound propagation properties, comprises:

estimating the ambient temperature value using a first regression model based only on the first sound propagation property; and estimating the relative humidity value using a second regression model corresponding to the ambient temperature value based on the first sound propagation property and the second sound propagation properties.

13. The method of claim 7, wherein determining the first sound propagation property and the second sound propagation properties, comprises:

estimating the ambient temperature value using a first regression model based only on the first sound propagation property;

identifying a second regression model from a plurality of regression models using the ambient temperature value; and estimating the relative humidity value using the second regression model based on the first sound propagation property and the second sound propagation properties.

14. A method comprising:

emitting an ultrasound signal using a speaker of a device, wherein the ultrasound signal is a single chirp comprising a Zadoff-Chu (ZC) sequence modulated using an Orthogonal Frequency-Division Multiplexing (OFDM) modulation scheme;

determining, using the ultrasound signal received using a microphone of the device, a signal component corresponding to a direct propagation path (DPP) between the speaker and the microphone;

determining, using the signal component, a first sound propagation property representing a speed of the ultrasound signal along the DPP;

determining, using the signal component, second sound propagation properties, wherein each sound propagation property of the second sound propagation properties each represents a sound attenuation of the ultrasound signal along the DPP in a respective frequency band of a plurality of frequency bands;

estimating an ambient temperature value based only on the first sound propagation property; and estimating a relative humidity value using a regression model corresponding to the ambient temperature value and based on the first sound propagation property and the second sound propagation properties.

15. The method of claim 14, wherein the first sound propagation property is at least one of a Time-of-Flight (ToF) value or a Time-Difference-of-Arrival (TDoA) value.

16. The method of claim 14, wherein generating the ultrasound signal comprises:

generating a first baseband signal comprising the ZC sequence in a time domain;

converting the ZC sequence in the time domain to a frequency-domain ZC sequence using a Discrete Fourier Transform (DFT);

modulating the frequency-domain ZC sequence using the OFDM modulation scheme at multiple carrier frequencies to obtain multiple modulated signals, wherein a negative frequency point in the frequency-domain ZC sequence is set to a conjugate counterpart of a positive frequency point; and converting the multiple modulated signals to the ultrasound signal in the time domain using an inverse DFT (IDFT), wherein the ultrasound signal is an N-point ultrasound signal.

17. The method of claim 14, wherein extracting the signal component comprises:

segmenting the ultrasound signal into frames;

converting the frames from time domain to frequency domain;

demodulating the frames with a time-domain ZC sequence at multiple carrier frequencies to obtain multiple demodulated signals in the frequency domain;

converting the multiple demodulated signals to multiple baseband signals in the time domain; and extracting a set of complex-valued impulse responses (IRs) from each of the multiple baseband signals, each set of complex-value IRs corresponding to one of the multiple carrier frequencies.

* * * * *